US011831794B1

(12) United States Patent
Ross et al.

(10) Patent No.: US 11,831,794 B1
(45) Date of Patent: Nov. 28, 2023

(54) SYSTEM AND METHOD FOR MANAGING ROUTING OF LEADS

(71) Applicant: MASSACHUSETTS MUTUAL LIFE INSURANCE COMPANY, Springfield, MA (US)

(72) Inventors: Gareth Ross, Amherst, MA (US); Andrew Reagan, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 434 days.

(21) Appl. No.: 16/219,892

(22) Filed: Dec. 13, 2018

Related U.S. Application Data

(63) Continuation-in-part of application No. 14/576,993, filed on Dec. 19, 2014, now abandoned.
(Continued)

(51) Int. Cl.
*G06Q 30/0202* (2023.01)
*G06Q 30/01* (2023.01)
(Continued)

(52) U.S. Cl.
CPC ........ *H04M 3/5175* (2013.01); *G06F 16/285* (2019.01); *G06N 20/00* (2019.01); *G06Q 30/01* (2013.01); *G06Q 30/0202* (2013.01)

(58) Field of Classification Search
CPC . G06Q 30/0202; G06Q 30/01; H04M 3/5175; G06F 16/285; G06N 20/00
See application file for complete search history.

(56) References Cited

U.S. PATENT DOCUMENTS

| 5,519,773 A | 5/1996 | Dumas et al. |
| 6,611,590 B1 | 8/2003 | Lu et al. |

(Continued)

FOREIGN PATENT DOCUMENTS

| EP | 2109302 B1 | 9/2010 |
| WO | 2009065052 A1 | 5/2009 |
| WO | WO-2017/200558 A1 | 11/2017 |

OTHER PUBLICATIONS

Yu, W. (2003). Agent-based demand forecasting for supply chain management (Order No. 3089526). Available from ProQuest Dissertations and Theses Professional. (305323160). (Year: 2003).*
(Continued)

*Primary Examiner* — Matthew E Zimmerman
*Assistant Examiner* — Latasha D Ramphal
(74) *Attorney, Agent, or Firm* — Foley & Lardner LLP

(57) ABSTRACT

A routing system of a call center determines a plurality of advisor clusters to be assigned to each of a plurality of lead records stored in a lead model database. The predictive machine learning model inputs lead model data and advisor model data into a clustering analysis. Various modeling data are extracted from source lead data, sales data, and advisor data, in which the advisor data has been flattened for modeling. The predictive machine learning model applies a combination of a clustering analysis, a cluster model, and an aggregate conversion model to lead model data and user model data. The clustering analysis utilizes unsupervised clustering and supervised clustering, and outputs a plurality of advisor clusters and sales conversion scores. The clustering analysis clusters each of the advisors into one of the plurality of advisor clusters based on degree of similarity of a clustering vector.

19 Claims, 13 Drawing Sheets

Related U.S. Application Data

(60) Provisional application No. 61/922,139, filed on Dec. 31, 2013, provisional application No. 61/921,760, filed on Dec. 30, 2013.

(51) Int. Cl.
    *H04M 3/51*      (2006.01)
    *G06F 16/28*      (2019.01)
    *G06N 20/00*      (2019.01)

(56) References Cited

U.S. PATENT DOCUMENTS

| | | | |
|---|---|---|---|
| 6,862,574 B1 | 3/2005 | Srikant et al. | |
| 6,879,683 B1 | 4/2005 | Fain et al. | |
| 6,970,554 B1 | 11/2005 | Peterson et al. | |
| 6,975,720 B1 | 12/2005 | Crook | |
| 7,023,979 B1 | 4/2006 | Wu et al. | |
| 7,035,811 B2 | 4/2006 | Gorenstein | |
| 7,085,740 B1 | 8/2006 | Meyers | |
| 8,355,934 B2 | 1/2013 | Virdhagriswaran | |
| 8,379,830 B1 | 2/2013 | Naik et al. | |
| 8,515,736 B1 | 8/2013 | Duta | |
| 8,548,843 B2 | 10/2013 | Folk et al. | |
| 8,577,014 B2 | 11/2013 | Brandt et al. | |
| 8,582,750 B2 | 11/2013 | Lee et al. | |
| 8,781,092 B2 | 7/2014 | Noble, Jr. | |
| 9,160,851 B2 | 10/2015 | Kugler et al. | |
| 9,263,038 B2 | 2/2016 | Flaks et al. | |
| 9,582,786 B2 | 2/2017 | Gubin et al. | |
| 9,635,181 B1 | 4/2017 | McGann et al. | |
| 9,680,996 B2 | 6/2017 | Kumar et al. | |
| 9,911,131 B1 | 3/2018 | Ross et al. | |
| 9,916,538 B2 | 3/2018 | Zadeh et al. | |
| 10,257,357 B1 | 4/2019 | Merritt | |
| 11,509,771 B1 | 11/2022 | Ross et al. | |
| 2002/0138492 A1 | 9/2002 | Kil | |
| 2004/0081311 A1 | 4/2004 | Thompson | |
| 2005/0195966 A1 | 9/2005 | Adar et al. | |
| 2006/0041500 A1 | 2/2006 | Diana et al. | |
| 2006/0229896 A1 | 10/2006 | Rosen et al. | |
| 2006/0265259 A1 | 11/2006 | Diana et al. | |
| 2007/0094181 A1 | 4/2007 | Tayebnejad et al. | |
| 2007/0136164 A1 | 6/2007 | Roti et al. | |
| 2007/0239769 A1* | 10/2007 | Fazal | G06F 16/248 |
| | | | 707/999.102 |
| 2008/0120129 A1 | 5/2008 | Seubert et al. | |
| 2008/0162258 A1 | 7/2008 | Kala et al. | |
| 2008/0184270 A1 | 7/2008 | Cole et al. | |
| 2008/0294501 A1 | 11/2008 | Rennich | |
| 2009/0144070 A1* | 6/2009 | Psota | G06Q 30/0609 |
| | | | 705/330 |
| 2009/0190744 A1 | 7/2009 | Xie et al. | |
| 2009/0190745 A1 | 7/2009 | Xie et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine et al. | |
| 2010/0030578 A1 | 2/2010 | Siddique et al. | |
| 2010/0054453 A1 | 3/2010 | Stewart | |
| 2010/0114573 A1 | 5/2010 | Huang et al. | |
| 2010/0306249 A1 | 12/2010 | Hill et al. | |
| 2011/0196776 A1 | 8/2011 | Rash et al. | |
| 2011/0246409 A1* | 10/2011 | Mitra | G06F 17/18 |
| | | | 702/179 |
| 2011/0258016 A1 | 10/2011 | Barak et al. | |
| 2011/0258067 A1 | 10/2011 | Rowell | |
| 2011/0307257 A1 | 12/2011 | Pereg et al. | |
| 2011/0314690 A1* | 12/2011 | Stanish | F26B 25/22 |
| | | | 34/524 |
| 2012/0051537 A1* | 3/2012 | Chishti | H04M 3/5233 |
| | | | 379/265.11 |
| 2012/0053986 A1 | 3/2012 | Cardno et al. | |
| 2012/0066065 A1 | 3/2012 | Switzer | |
| 2012/0166445 A1 | 6/2012 | Chakrabarti et al. | |
| 2012/0203584 A1 | 8/2012 | Mishor et al. | |
| 2012/0278091 A1* | 11/2012 | Yaseen | G06Q 30/02 |
| | | | 705/1.1 |
| 2013/0006916 A1 | 1/2013 | Mcbride et al. | |
| 2013/0013601 A1* | 1/2013 | Kabiljo | G06F 16/95 |
| | | | 707/737 |
| 2013/0215116 A1 | 8/2013 | Siddique et al. | |
| 2013/0218634 A1 | 8/2013 | Hills et al. | |
| 2013/0236002 A1 | 9/2013 | Jennings et al. | |
| 2014/0058831 A1 | 2/2014 | Duva et al. | |
| 2014/0133646 A1 | 5/2014 | Ma et al. | |
| 2014/0149178 A1 | 5/2014 | Hedges | |
| 2014/0149339 A1 | 5/2014 | Title et al. | |
| 2014/0153703 A1 | 6/2014 | Desai et al. | |
| 2014/0201126 A1 | 7/2014 | Zadeh et al. | |
| 2014/0229406 A1 | 8/2014 | Puzis et al. | |
| 2014/0279722 A1 | 9/2014 | Singh et al. | |
| 2014/0289005 A1 | 9/2014 | Laing et al. | |
| 2015/0046219 A1 | 2/2015 | Shavlik | |
| 2015/0332372 A1* | 11/2015 | Hariri | G06F 3/048 |
| | | | 705/26.7 |
| 2016/0071117 A1 | 3/2016 | Duncan | |
| 2016/0337795 A1 | 11/2016 | Nachman et al. | |
| 2016/0342903 A1* | 11/2016 | Shumpert | G06F 11/008 |
| 2017/0013131 A1* | 1/2017 | Craib | G06Q 30/016 |
| 2017/0124581 A1 | 5/2017 | Wilson et al. | |
| 2017/0223190 A1 | 8/2017 | Mandel et al. | |
| 2017/0243137 A1 | 8/2017 | Mandel et al. | |
| 2019/0132451 A1 | 5/2019 | Kannan | |

OTHER PUBLICATIONS

W.F. Cody et al., The integration of business intelligence and knowledge management; IBM Systems Journal, vol. 41, No. 4; <https://pdfs.semanticscholar.org/3803/10409dd7822c6007d5c76808b8c28698e2cd.pdf>, Jul. 12, 2002; 17 pages.

Sara Costa, "Call Flow—Talkdesk Support", <https://support.talkdesk.com/hc/en-us/articles/206196766-Call-Flow> Jan. 18, 2018, 6 pages.

Raquel Florez-Lopez et al., "Marketing Segmentation Through Machine Learning Models", <https://pdfs.semanticscholar.org/ef05/502e936a94cafa0037c764bfb2212f385d97.pdf>, Social Science Computer Review, Oct. 8, 2008, 22 pages.

Sanford Gayle, "The Marriage of Market Basket Analysis to Predictive Modeling", <http://ai.stanford.edu/~ronnyk/WEBKDD2000/papers/gayle.pdf>, Published 2000, 6 pages.

Carlos Guestrin, "Unsupervised learning or Clustering—K-means Gaussian mixture models", <http://www.cs.cmu.edu/~guestrin/Class/10701-S07/Slides/clustering.pdf>, Apr. 4, 2007, 67 pages.

YongSeog Kim, "Customer Targeting: A Neural Network Approach Guided by Genetic Algorithms", <http://citeseerx.ist.psu.edu/viewdoc/download?doi=10.1.1.2.697&rep=rep1&type=pdf>, Feb. 1, 2005, 31 pages.

Dragomir Yankov et al., "Evaluation of Explore-Exploit Policies in Multi-result Ranking Systems", <https://arxiv.org/pdf/1504.07662.pdf>, Apr. 28, 2015, 9 pages.

Golbeck, Jenifer Ann, Computing and applying trust in we-based social networks, Diss. 2005.

Wang, Jyun-Cheng et al., "Recommending trusted online auction sellers using social network analysis". Expert Systems with Applications 34.3 (2008), pp. 1666-1679.

Shi-Jen Lin, et al., Combining ranking concept and social network analysis to detect collusive groups in online auctions, Expert Systems with Applications, vol. 30, Issue 10, pp. 9079-9086.

Paula Bernier; Genesys Interactive Voice Response; <http://www.genesys.com/solutions/customer-engagement/inbound/intelligent-voice-response>, Oct. 3, 2017; 3 pages.

Paula Bernier, Genesys Speech & Text Analytics; <http://www.genesys.com/solutions/employee-engagement/workforce-optimization/workforce-planning/speech-text-analytics>, Oct. 3, 2017; 4 pages.

Dawn Jutla; Enabling and Measuring Electronic Customer Relationship Management Readiness; Proceedings of the 34th Hawaii International Conference on System Sciences—2001; <http://www.computer.org/csdl/proceedings/hicss/2001/0981/07/09817023.pdf>, Aug. 7, 2002; 19 pages.

(56) References Cited

OTHER PUBLICATIONS

Gianmario Motta et al.; Forecasting in multi-skill call centers; 2013 Fifth International Conference on Service Science and Innovation (ICSSI); <http://ieeexplore.ieee.org/abstract/document/6599389/>, Oct. 24, 2013; 7 pages.

Haipeng Shen et al.; Forecasting Time Series of Inhomogenous Poisson Processes with Application to Call Center Workforce Management; The Annals of Applied Statistics; <https://www.unc.edu/~haipeng/publication/poissonSVD.pdf>, Jul. 25, 2008; 25 pages.

Evgeny Stepanov <https://www.researchgate.net/profile/Evgeny_Stepanov> et al.; Automatic Summarization of Call-center Conversations; Conference: IEEE Automatic Speech Recognition and Understanding Workshop (ASRU 2015); <https://www.researchgate.net/publication/282976793_Automatic_Summarization_of_Call-center_Conversations>, Dec. 2015; 3 pages.

Non-Final Office Action on U.S. Appl. No. 16/125,503 dated Aug. 6, 2020.

Yu, (2003). "Agent-based Demand for Supply Chain Management", Available from ProQuest Dissertations and Theses Professional. Retrieved from https://dialog.proquest.com/professional/docview/305323160?accountid=131444, May 10, 2003, 160 pages.

\* cited by examiner

SYSTEM AND METHOD FOR MANAGING ROUTING OF LEADS

CROSS-REFERENCE TO RELATED APPLICATIONS

This application is a continuation-in-part of U.S. Ser. No. 14/576,993, entitled "METHOD FOR AUCTIONING LEADS TO AGENTS," filed Dec. 19, 2014, which claims benefit of U.S. Provisional App. No. 61/921,760, filed Dec. 30, 2013, and U.S. Provisional App. No. 61/922,139, filed Dec. 31, 2013, all of which are incorporated by reference in their entirety.

This application is related to U.S. Ser. No. 16/110,872, filed Aug. 23, 2018, which claims benefit of U.S. Provisional App. No. 62/551,690, filed Aug. 29, 2017, U.S. Provisional App. No. 62/648,330, filed Mar. 26, 2018, U.S. Provisional App. No. 62/648,325, filed Mar. 26, 2018, and U.S. Provisional App. No. 62/687,130, filed Jun. 19, 2018, all of which are incorporated by reference in their entirety.

TECHNICAL FIELD

The present disclosure relates generally to customer contact centers and their operation and, more particularly, to a system and method for managing routing of leads to agents.

BACKGROUND

Customer contact centers provide an important interface for customers and leads of an organization to contact the organization. The contact can be for a request for a product or service, for trouble reporting, service request, etc. The typical contact mechanism in a conventional call center is via a telephone, but it could be via a number of other electronic channels, including email, online chat, etc.

The contact center consists of a number of human agents (also herein called advisors), each assigned to a telecommunication device, such as a phone or a computer, for conducting email or Internet chat sessions, that is connected to a central switch. Using these devices, agents or advisors generally provide sales, customer service, or technical support to the customers or prospective customers of a contact center or of the contact center's sponsoring organization. In the present disclosure, such customers or prospective customers are sometimes called leads. Conventionally, a contact center operation includes a switch system that connects callers to agents. In an inbound contact center, these switches route inbound callers to a particular agent in a contact center, or, if multiple contact centers are deployed, to a particular contact center for further routing. When a call is received at a contact center (which can be physically distributed, e.g., the agents may or may not be in a single physical location), if a call is not answered immediately, the switch will typically place the caller or lead on hold and then route the caller to the next agent that becomes available. This is sometimes referred to as placing the lead in a call queue. In some cases, the call center assigns a lead to an agent or to a group of agents to call back the lead following an inbound call, or to place an outbound call to the lead other than in response to an inbound call by the lead.

In many call centers, the agents answering calls or placing call-backs or outbound calls, are organized into a plurality of groups or teams. Different agent groups often have responsibility for different goals or functions of the call center, such as generating customer leads, closing sales with prospects, and servicing existing customers. Routing an inbound caller to an appropriate agents group or team of the call center that is best qualified to address the needs of that caller can be a burdensome, unreliable process.

There is a need to improve traditional methods of routing leads to agents to improve allocation of limited call center resources to leads, to efficiently route leads to appropriate agents or agent groups of a call center at the time of an inbound call, or to efficiently assign leads to agents or agent groups for call-backs or other outbound calls.

SUMMARY

The methods and systems described herein attempt to address the deficiencies of the conventional systems to more efficiently analyze and route leads to users using a predictive machine learning model and to display a specialized graphical user interface configured to present the lead data.

The predictive machine learning model is configured to determine an advisors cluster to be assigned to each lead record of a plurality of lead records stored in a lead model database. The predictive machine learning model inputs lead model data and advisor model data into a clustering analysis. In an embodiment, the lead model data and advisor model data are extracted from source databases including lead data representative of leads of an enterprise, advisor data representative of advisors of the enterprise, and sales data representative of sales of the enterprise. The clustering analysis can utilize unsupervised clustering in conjunction with supervised clustering. The clustering analysis outputs a plurality of advisor clusters. An agent routing model outputs sales conversion scores representative of a likelihood that respective leads will accept an offer to purchase a product of the enterprise.

As used in the present disclosure, an agent routing model may include a cluster model, an aggregate conversion model, or a combination of these models. Cluster models employ advisor clusterings as inputs, whereas aggregate conversion models do not employ adviser clusterings as inputs. In various embodiments, aggregate conversion models use as input lead features only, lead-advisor interaction features only or combinations of leads features and lead advisor interaction features.

The clustering analysis determines a clustering vector for each of the advisors of the enterprise from advisor modeling data. In an embodiment, an advisor model dataset incorporates advisor lead data that has been extracted from one or more advisor databases for the advisors of the enterprise and has been transformed by flattening the data. The flattened advisor data includes data for the agent's book of business. The clustering analysis clusters each of the advisors of the enterprise into one of the plurality of advisor clusters based on degree of similarity of the clustering vectors for respective advisors.

The clustering analysis determines a clustering vector for each of the advisors of the enterprise via advisor attributes selected from features of the advisor modeling data. In an embodiment, the advisor attributes comprise advisor gender and advisor age range. In an embodiment, the advisor attributes comprise weighted features in book of business data for the agent, such as average first year premium, total policies, and distribution of policy types.

A clustering vector used in clustering advisors is one or more of a connectivity function, a central vector, a graph partition, and a density function. In an embodiment, the clustering analysis is selected from one of more of Gaussian Mixture Model (GMM), k-means, spectral clustering, principal component analysis (PCA), and density-based clustering.

In various embodiments, clustering models and aggregate conversion models are employed to generate agent routing assignments. Agent routing assignments include assignments of leads to agent clusters, and assignments of leads to individual agents within agent clusters. In various embodiments, clustering models and aggregate conversion models also generate conversion scores used in agent routing assignments.

In various embodiments, agent routing models are applied to a dataset of pre-processed lead data. The pre-processed lead data is transformed via standardization and application of imputation. The pre-processed lead data includes an appended column for each observation's advisor cluster, generated via agent clustering.

In various embodiments, agent routing models assign a given lead to an individual agent of the enterprise. In an embodiment, a cluster based model selects the individual advisor from a cluster of agents assigned to the given lead. In an embodiment, the agent routing system assigns a conversion score to each pair of leads and advisors. An aggregate conversion model determines conversion scores independently of agent clustering. In various embodiments, aggregate conversion models assign a lead to an advisor cluster by determining what agent within the assigned cluster has the highest conversion score for that lead. In various embodiments, aggregate conversion models assign a lead to an advisor cluster by applying Bayesian Bandits heuristics, such as Thompson sampling, to assign leads to advisor clusters based upon calculated probabilities that the assignments maximize cumulative expected conversion scores.

In an embodiment, predictive machine learning model is configured to determine an assigned user cluster for each lead record of a plurality of lead records stored in a lead model database. The predictive machine learning model applies a combination of a clustering analysis, a cluster model, and an aggregate conversion model to lead model data representative of leads and user model data representative of users. The predictive machine learning model outputs a plurality of user clusters and sales conversion scores representative of a likelihood that respective leads will accept an offer to purchase a product.

In various embodiments, clustering analysis employs unsupervised clustering, supervised clustering, or a combination of these techniques, and outputs a plurality of user clusters. In various embodiments, a cluster model receives user clusters as input in modeling agent routing assignments and/or conversion scores. In various embodiments, an aggregate conversion model predicts conversion without using agent clusterings as input to the model.

In one embodiment, a processor-based method comprises executing, by a processor, a predictive machine learning model configured to determine an assigned user cluster for each lead record of a plurality of lead records stored in a lead model database, by inputting lead model data representative of leads and user model data representative of users into a clustering analysis utilizing unsupervised clustering in conjunction with supervised clustering, the clustering analysis outputting a plurality of user clusters and sales conversion scores representative of a likelihood that respective leads will accept an offer to purchase a product, wherein the predictive machine learning model is continually trained using updated lead model data and user model data generated by extracting data representative of the users from one or more user databases and flattening the extracted data; and wherein the predictive machine learning model comprises a clustering analysis that determines a clustering vector for each of the users from the user model data, and the clustering analysis clusters each of the users into one of the plurality of user clusters based on degree of similarity of the clustering vector, wherein the clustering vector is one or more of a connectivity function, a central vector, a graph partition, and a density function; and running, by the processor, the predictive machine learning module on demand to update and display, by a display device in operative communication with the processor, a graphical user interface including information representative of the plurality of user clusters and assignments of respective leads to respective user clusters within the plurality of user clusters.

In another embodiment, a processor-based method comprises executing, by a processor, a predictive machine learning model configured to determine an assigned user cluster and an individual assigned user for each lead record of a plurality of lead records stored in a lead model database, by inputting lead model data representative of leads and user model data representative of users into a clustering analysis utilizing unsupervised clustering in conjunction with supervised clustering, the clustering analysis outputting a plurality of user clusters, and sales conversion scores representative of a likelihood that respective leads will accept an offer to purchase a product from respective assigned users within the user clusters, wherein the predictive machine learning model comprises a clustering analysis that determines a clustering vector for each of the users of the enterprise from the user model data and the clustering analysis clusters each of the users into one of the plurality of user clusters based on degree of similarity of the clustering vector, and wherein the clustering analysis is selected from one of more of Gaussian Mixture Model, k-means, spectral clustering, principal component analysis (PCA), and density-based spatial clustering of applications with noise (DBSCAN), and the clustering vector is one or more of a connectivity function, a central vector, a graph partition, and a density function; and running, by the processor, the predictive machine learning module on demand to update and display, by a display device in operative communication with the processor, a graphical user interface (GUI) including information representative of the plurality of user clusters and assignments of respective leads to respective user clusters within the plurality of user clusters and to respective assigned users within the respective user clusters.

In yet another embodiment, a system comprises a non-transitory machine-readable memory that stores lead model records for a plurality of leads, sales records for a plurality of sales, and user model records for a plurality of users, wherein the user model records comprise a flattened data structure comprising a single record for each of the plurality of users; a predictive modeling module that stores a predictive machine learning model configured to determine an assigned user cluster for each lead model for the plurality of leads of the enterprise by applying a clustering analysis utilizing unsupervised clustering in conjunction with supervised clustering; and a processor in operative communication with the display, configured to execute a routing module, wherein the processor in communication with the non-transitory, machine-readable memory and the predictive modeling module executes a set of instructions instructing the processor, for each user model record, to: apply the clustering analysis to the lead model data, the sales data, and the user model data to determine a plurality of user clusters by determining a clustering vector for each of the users in the user model data and including each of the users in one of the plurality of user clusters based on degree of similarity of the clustering vector; apply the predictive machine learning model to assign each of the leads of an enterprise to one of the plurality of user clusters determined by the clustering analysis; output the plurality of user clusters, the users included in each of the plurality of user clusters, and the assignments of each of the leads of an enterprise to one of the plurality of user clusters; and run the predictive machine learning module on demand to update and display, by a display device in operative communication with the processor, a graphical user interface including information representative of the plurality of user clusters, the users included in each of the plurality of user clusters, and the assignments of each of the leads of an enterprise to one of the plurality of user clusters.

In another embodiment, a processor-based method comprises executing, by a processor, a predictive machine learning model configured to determine an assigned user cluster for each lead record of a plurality of lead records stored in a lead model database, by applying a combination of a clustering analysis, a cluster model, and an aggregate conversion model, to lead model data representative of leads and user model data representative of users, the predictive machine learning model outputting a plurality of user clusters and sales conversion scores representative of a likelihood that respective leads will accept an offer to purchase a product, wherein the predictive machine learning model is continually trained using updated lead model data and user model data; and wherein the clustering analysis determines a clustering vector for each of the users from the user model data, and the clustering analysis clusters each of the users into one of the plurality of user clusters based on degree of similarity of the clustering vector; and running, by the processor, the predictive machine learning module on demand to update and display, by a display device in operative communication with the processor, a graphical user interface including information representative of the plurality of user clusters and assignments of respective leads to respective user clusters within the plurality of user clusters.

In yet another embodiment, a processor-based method comprises executing, by a processor, a predictive machine learning model configured to determine an assigned user cluster and an individual assigned user for each lead record of a plurality of lead records stored in a lead model database, by applying a combination of a clustering analysis, a cluster model, and an aggregate conversion model, to lead model data representative of leads and user model data representative of users, the predictive machine learning model outputting a plurality of user clusters, and sales conversion scores representative of a likelihood that respective leads will accept an offer to purchase a product from respective assigned users within the user clusters, wherein the clustering analysis determines a clustering vector for each of the users of the enterprise from the user model data and clusters each of the users into one of the plurality of user clusters based on degree of similarity of the clustering vector, and wherein the aggregate conversion model assigns each of the leads to one of the users via one of greedy model that determines a user that has a highest conversion score for that lead, or Bayesian Bandits heuristics that assign leads to users in order to maximize cumulative expected conversion scores; and running, by the processor, the predictive machine learning module on demand to update and display, by a display device in operative communication with the processor, a graphical user interface (GUI) including information representative of the plurality of user clusters and assignments of respective leads to respective user clusters within the plurality of user clusters and to respective assigned users within the respective user clusters.

In a further embodiment, a system comprises non-transitory machine-readable memory that stores lead model records for a plurality of leads, sales records for a plurality of sales, and user model records for a plurality of users, wherein the user model records comprise a flattened data structure comprising a single record for each of the plurality of users; a predictive modeling module that stores a predictive machine learning model configured to determine an assigned user cluster for each lead model for the plurality of leads of the enterprise by applying a combination of a clustering analysis, a cluster model, and an aggregate conversion model; and a processor in operative communication with the display, configured to execute a routing module, wherein the processor in communication with the non-transitory, machine-readable memory and the predictive modeling module executes a set of instructions instructing the processor, for each user model record, to: apply the clustering analysis to the lead model data, the sales data, and the user model data to determine a plurality of user clusters by determining a clustering vector for each of the users in the user model data and including each of the users in one of the plurality of user clusters based on degree of similarity of the clustering vector; apply the cluster model and the aggregate conversion model to assign each of the leads of an enterprise to one of the plurality of user clusters determined by the clustering analysis; output the plurality of user clusters, the users included in each of the plurality of user clusters, and the assignments of each of the leads of an enterprise to one of the plurality of user clusters; and run the predictive machine learning module on demand to update and display, by a display device in operative communication with the processor, a graphical user interface including information representative of the plurality of user clusters, the users included in each of the plurality of user clusters, and the assignments of each of the leads of an enterprise to one of the plurality of user clusters.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
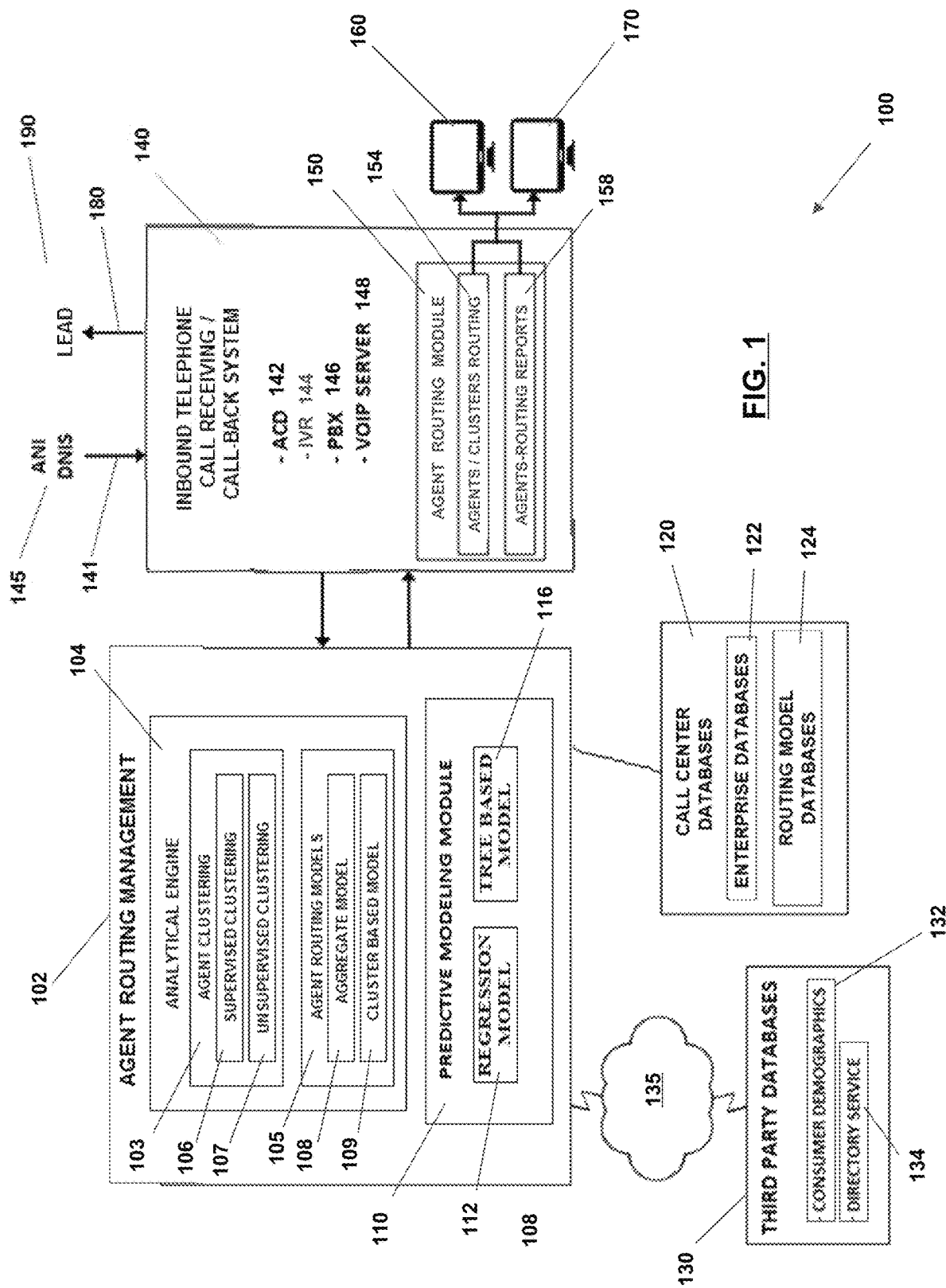
FIG. 1 is a system architecture for an agent routing management system of a call center, in accordance with an embodiment of the invention.

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

Contact routing at an inbound contact center can be structured to connect callers to agents (also referred to as advisors and users) based on particular criteria. For example, callers may be routed to agents that have been idle for the longest period of time. In the case of an inbound caller where only one agent may be available, that agent is generally selected for the caller without further analysis. In another example of routing an inbound call, if there are eight agents at a contact center, and seven are occupied with callers, the switch will generally route the inbound caller to the one agent that is available. If all eight agents are occupied with contacts, the switch will typically put the caller on hold and then route the caller to the next agent that becomes available. More generally, the contact center will set up a queue of inbound callers and preferentially route the longest-waiting callers to the agents that become available over time. A pattern of routing callers to either the first available agent or the longest-waiting agent is sometimes referred to as "round-robin" caller routing.

Call center operations include various types of call queues. For example, an inbound caller may be put on hold and placed on an answering queue or hold list, to be routed to a live agent when the caller has moved up to the first position in the call queue. In another example, if call centers are unable to route inbound callers to a live agent within a reasonable period of time, an inbound caller may be placed on a call-back list, to receive a call-back from a live agent when the caller has moved up to the first position on the call-back list. In some call centers, an inbound caller is routed to one of a plurality of groups of call center agents (e.g., two groups). For example, different agent groups may be dedicated to or may include agents skilled in different services of a contact center, different product lines of a sponsoring enterprise, etc., and in many cases a particular group of agents may be best qualified to deal with the needs of a given lead. In some cases, a particular group of agents may be most likely to close a sale to the lead, also herein called conversion of the lead.

Some call centers utilize call routing processes that attempt to match an inbound caller or lead to the "best" agent, or group of call center agents, for the particular lead. However, these systems can be highly unreliable, e.g., due to insufficient data to properly match agents to leads. The systems and methods described herein offer an improved routing of leads to groups or agents or advisors, and in some cases to particular agents or advisors within such agent groups.

The method and system of the present disclosure apply computer-implemented dynamic techniques for routing leads, whether during an inbound call or at a subsequent time, to groups of agents or to individual agents that are identified as best matching the leads based on a predictive machine learning model. A customer database tracks individuals who are customers of a sponsoring organization or client of the call center, or other enterprise served by the call center, associating these individuals with one or more groups representing general types of customers. These customer groups include prospects, leads, new business and purchasers (also herein called sales). Data from the customer database can be used in selecting a group of agents from a plurality of groups of agents of the call center in routing an inbound caller that has been identified as a given customer in the customer database. In the present disclosure, customer database data is sometimes called "enterprise customer data," denoting data relating to customers of the sponsoring enterprise.

In the present disclosure, an inbound contact center is sometimes referred to as a contact center or a call center. The individuals that interact with the contact center using a telecommunication device are referred to herein as leads and, alternatively, are referred to as callers, as customers, or as any of various general types of customers tracked in a customer database of the call center's sponsoring organization or enterprise.

In an embodiment of the customer groups in the customer database, "prospects" are individuals that have contacted the enterprise. Inbound prospects may or may not be customers in the customer databases. In an embodiment, if an inbound caller is not identified with an individual in the customer database, the database opens a new record for that caller in the prospects group. "Leads" include individuals who have expressed interest in one or more products of the enterprise; as used herein products may include goods or services sold by the enterprise, or a combination of these. A lead may have previously been a prospect or may not have been a prospect (e.g., an individual that searches for products or services of the enterprise online). "New Business" (also herein called new business applicants) identifies applicants to purchase one or more products of the enterprise, where such purchase requires underwriting. These applicants may have been prospects, leads or both. "Purchasers" (also herein called "sales") generally are individuals that own a product of the enterprise. Purchasers may have been prospects, leads, new business applicants, or any combination of these groups.

The present disclosure generally uses the term "lead" more broadly than the defined types of customer in the customer database described above. As used in the present disclosure, a lead can include an individual corresponding to any of the above-described types of customer, who is considered a lead for business of the sponsoring enterprise.

In an embodiment, a machine learning model is configured for clustering agents into groups or clusters. As used in the present disclosure, machine learning models for clustering agents into groups or clusters are called clustering analyses, agent clustering analyses or simply clusterings. In various embodiments, the clustering analysis utilizes one or more clustering approach selected from unsupervised clustering, supervised clustering, and combinations of unsupervised clustering with supervised clustering. In an embodiment, a machine learning model inputs lead model data and advisor model data into a clustering analysis. In an embodiment, the lead model data and advisor model data are extracted from source data representative of leads of an enterprise, advisors of the enterprise, and sales of the enterprise.

In various embodiments, agent routing methods and systems of the present disclosure utilize various modeling approaches for agent routing management. In various embodiments, agent routing models are employed to generate agent routing assignments. In various embodiments, agent routing assignments include assignments of leads to agent clusters, and may also include assignments of leads to individual agents within agent clusters. In various embodiments, agent routing models are employed to generate conversion scores used in agent routing assignments.

In various embodiments, agent routing models are applied to a dataset of pre-processed lead data. In an embodiment, the pre-processed lead data is transformed via standardization and application of imputation. In an embodiment, the pre-processed lead data includes an appended column for each observation's advisor cluster, generated via agent clustering.

In various embodiments, agent routing models include machine learning models that predict conversion, without using agent clusterings as input to the models. In the present disclosure, agent routing models that do not use clusterings as input to the models are called aggregate conversion models or, alternatively, aggregate models. In various embodiments, aggregate conversion models use as input lead features only, lead-advisor interaction features only, or combinations of leads features and lead advisor interaction features.

In various embodiments, agent routing models use agent clusterings as input to the models. In the present disclosure, agent routing models agent that use clusterings as inputs to the models are called cluster models or, alternatively, cluster-based models. In the present disclosure, clustering analyses or clusterings, which assign agents to a plurality of groups or clusters, are contrasted to cluster models or cluster-based models, which use agent clusterings as inputs in modeling agent routing assignments and/or conversion scores.

In various embodiments, a cluster based model determines an advisors cluster to be assigned to each lead record of a plurality of lead records stored in a lead model database. In various embodiments, the cluster based model outputs a plurality of advisor clusters, and sales conversion scores representative of a likelihood that respective leads will accept an offer to purchase a product of the enterprise.

In an exemplary embodiment, conversion scores of an aggregate model that generates different scores for each agent, given a lead, are used in building a cluster based model. In an embodiment, the cluster based model uses the conversion scores to build clusters by clustering agents on their scores for all the leads in the data, then assigns scores to a fixed clustering by considering the scores for all of the agents in each cluster for the given lead.

In an embodiment, a clustering analysis determines a clustering vector for each of the advisors of the enterprise from final advisor modeling data. In an embodiment, the final advisor model incorporates advisor data that has been extracted from one or more advisor databases for the advisors of the enterprise, and transformed by flattening the data. In an embodiment, the clustering analysis clusters each of the advisors of the enterprise into one of the plurality of advisor clusters based on degree of similarity of the clustering vector.

In an embodiment, a clustering analysis determines the clustering vector for each of the advisors of the enterprise via advisor attributes selected from features of the advisor modeling data. In an embodiment utilizing simple demographic attributes, the weighted advisor attributes comprise advisor gender and advisor age range (e.g., male and female genders and five age range buckets, providing ten broad demographic groups). In another embodiment, the advisor attributes comprise weighted features from book of business data for the agent, such as average first year premium, total policies, and distribution of policy types.

In an embodiment, the clustering vector is one or more of a connectivity function, a central vector, a graph partition, and a density function. In an embodiment, the clustering analysis is selected from one of more of Gaussian Mixture Model (GMM), k-means, spectral clustering, principal component analysis (PCA), and density-based clustering (such as density-based spatial clustering of applications with noise, DBSCAN).

In various embodiments, after an agent routing model assigns a given lead to one of a plurality of clusters of agents, the agent routing model assigns that lead to an individual agent within the assigned cluster of agents. In an embodiment, a cluster based model selects the individual advisor from a cluster of agents assigned to the given lead. In an embodiment, the agent routing model assigns a conversion score to each pair of leads and advisors. In an embodiment, the determination of conversion score is carried out independently of clustering analysis. In an embodiment, the agent routing model assigns a lead to an individual agent by determining a lead within the assigned cluster of agents that has the highest conversion score for that lead, sometimes called a greedy algorithm. In other embodiments, the agent routing model applies Bayesian Bandits heuristics, such as Thompson sampling, to assign leads to agents based upon calculated probabilities that the assignments maximize cumulative expected conversion scores.

FIG. 1 shows a system architecture for an call management system 100 of a contact center, also herein called a call center, according to an illustrative embodiment. In the present disclosure, the call center is sometimes called an inbound call center or inbound contact center, referring to the function of receiving inbound customer calls. However, it should be understood that communications of the call center based on the agent routing methods of the present disclosure may include call-backs, or other outbound agent calls, to leads of the enterprise. Call management system 100 includes an agent routing management system 102, also called an agent routing system. The agent routing system 102 may be hosted on one or more computers (or servers), which may include or be communicatively coupled to one or more databases. Agent routing system 102 matches leads to groups of agents and to individual agents to manage call center resources in communications with leads of the enterprise. Agent routing management system 102 includes an analytical engine 104 containing an agent clustering module 103 and agent routing models 105. In an embodiment, agent clustering sub-module 103 includes a supervised clustering analysis 106 and an unsupervised clustering analysis 107. In an embodiment, agent routing models 105 includes an aggregate model 108 and a cluster based model 109. Predictive modeling module 110 includes a regression model 112 and a tree-based model 116. The analytical engine 104 with agent clustering module 103 including models 106 and 107; agent routing models 105 including models 108 and 109; and predictive modeling module 110 including models 112 and 116, may be executed by a processor of the inbound routing management system 102.

Inbound call management system 102 is interfaced with one or more internal databases 120 of the contact center. In an embodiment, internal databases include enterprise databases 122 which store information pertaining to a sponsoring organization of the call center, also herein called an enterprise, and routing model databases 124. Routing model databases 124 contain data extracted from enterprise databases 122 and optionally from third-party databases 130, wherein the extracted data has been transformed for modeling agent routing via methods of the present disclosure. In an embodiment, analytical engine 104 interacts with external services, applications, and databases, such as third-party databases 130, through one or more application programmable interfaces, an RSS feed, or some other structured format, via communication network 135. In the embodiment of FIG. 1, agent routing system 102 also retrieves data from one or more third-party databases 130, including a consumer demographics database 132 and a directory service database 134.

In an embodiment, internal databases 120 use rmm_analytics schema in VERTICA (https://rdmio/github/massmutual/mmlib/man/vertica_connect.html) to generate a table of enterprise customer data). In another embodiment, internal call center databases 120 use rmm_analytics schema to generate additional data tables, such as a table of historical leads and customer data, and a table of marketing costs data. Date fields are used for filtering data by date range.

In the exemplary embodiment, data used in predictive modeling also include data retrieved from a customer demographics database 132 to obtain information about customers. In an embodiment, customer demographics data includes individual-level data on customers.

In an embodiment, indexed customer demographics data in lead index 210 also includes data using zip-level features of the system, which provide a coarser representation in building the predictive model. Such zip-level features employ variables that have resolution at the zip-level for each individual in the zip code. In an exemplary embodiment, zip-level data for individual income is associated with a zip code median value. Reasons for using zip-level data in predictive modeling include, for example, lack of a statistically significant difference in model performance as a function of any match score threshold; simplicity of collecting only the name and zip code in the VRU system 144; and privacy considerations as to individual-level data.

In an embodiment, agent routing management system 102 labels each data element in the lead index 210 as continuous (including interval), binary, ordinal, or nominal (categorical). For use in a logistic regression model 112, variables that have lookup fields are converted to integers. Following feature transformation of the variables, the final view outputs each variable with human-readable names (if known), and a tag at the end of the variable name. Exemplary end tags for transformed variable names include:

_binary: either 0 or 1
_ordinal_to_binary: either 0 or 1, where null values are mapped to 0
_flat_binary: mapped from a string field like "01001000" into multiple fields
_ordinal: as an integer, with null values left null
_interval: as an integer, with null values left null
_continuous: as an integer, with null values left null
_nominal: as an integer, with null values mapped to an additional integer By applying the feature transformation rules described above, analytical engine 104 builds a simplified input data file from retrieved data. This simplified input data file facilitates predictive modeling with a binary target.

Databases 120 are organized collections of data, stored in non-transitory, machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating and/or administration of databases. The databases may conform to a well-known structural representational model, such as relational databases, object-oriented databases and network databases. Exemplary database management systems include MySQL, PostgreSQL, SQLite, Microsoft SQL Server, Microsoft Access, Oracle, SAP, dBASE, FoxPro, IBM DB2, LibreOffice Base, and FileMaker Pro.

Figure 2:
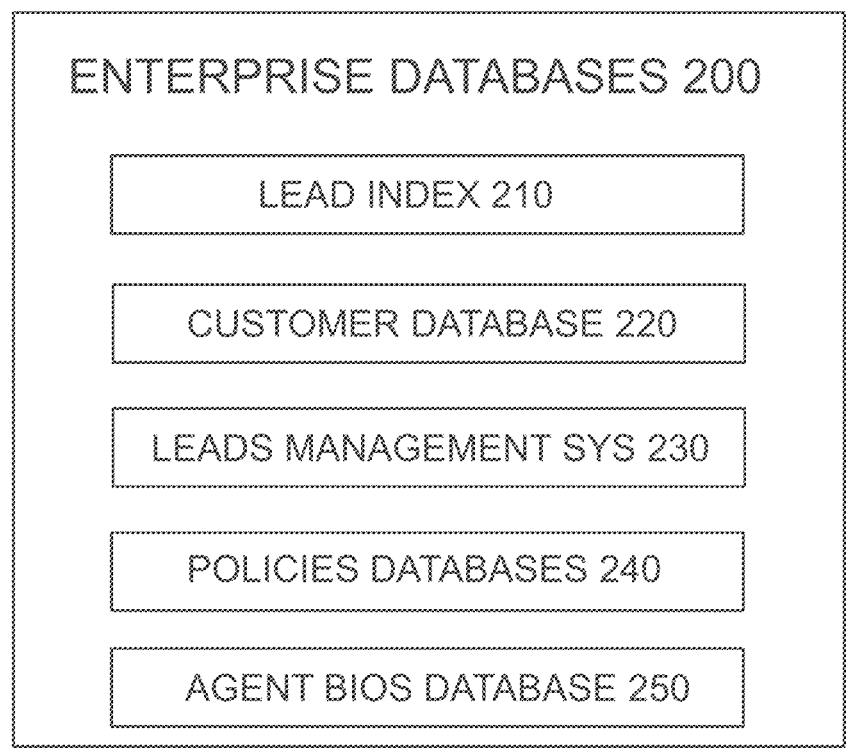
FIG. 2 is a block schematic diagram of enterprise databases, in accordance with an embodiment.
Figure 8:
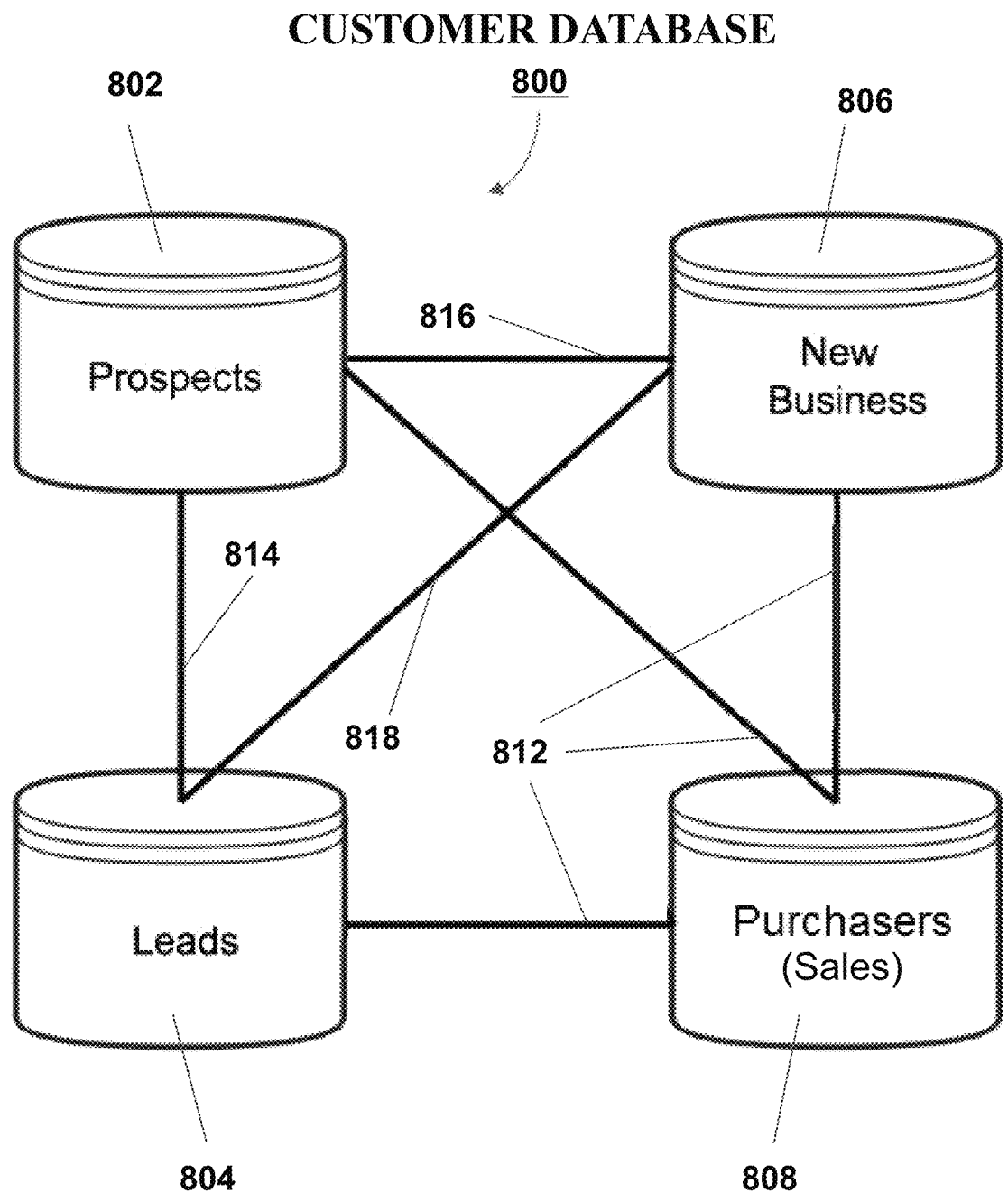
FIG. 8 is an architecture for a customer database including data stores for four target groups for marketing and customer acquisition of the enterprise, in accordance with an embodiment.
Figure 9:
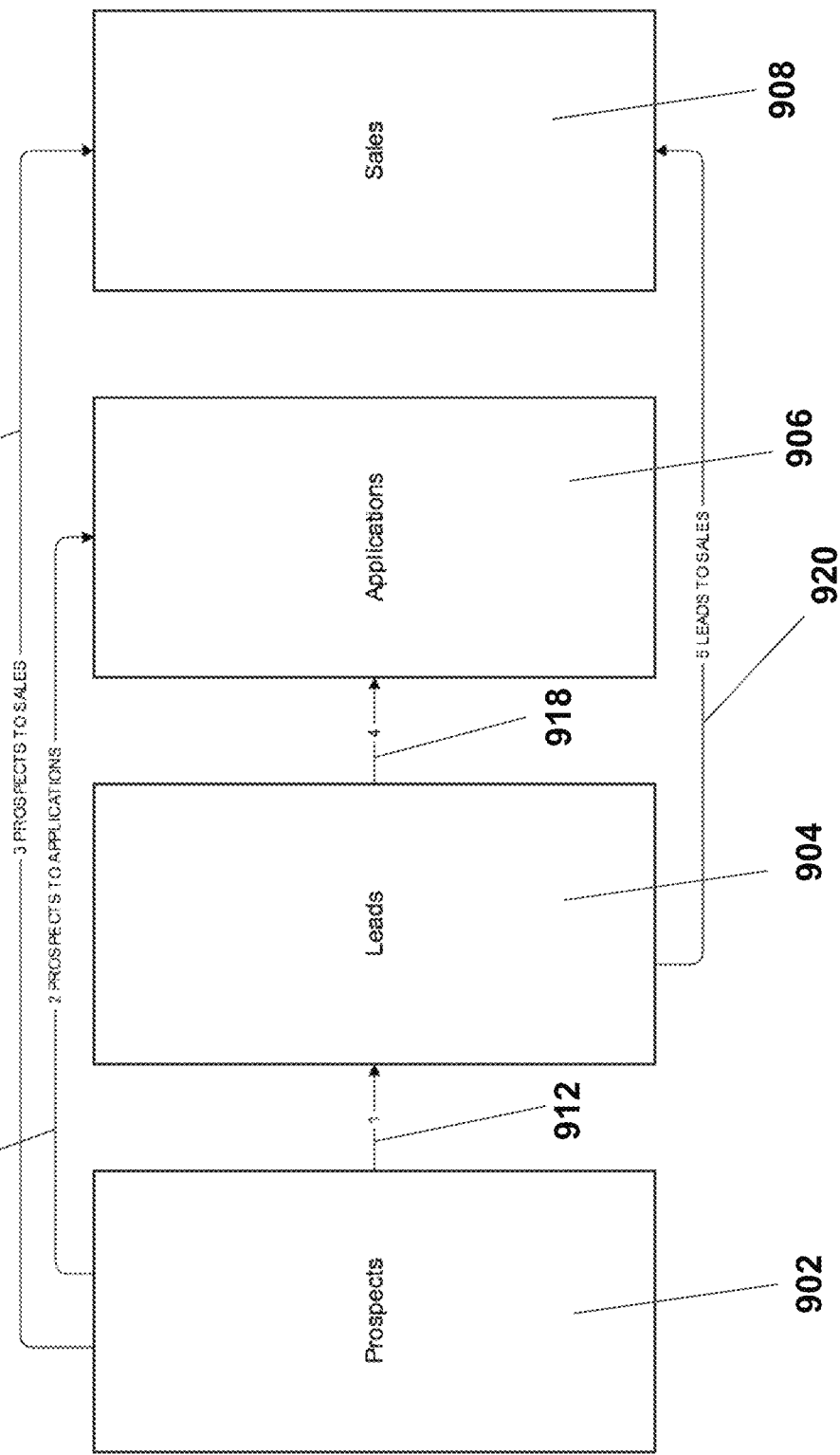
FIG. 9 is a flow chart diagram of attribution processes for tracking persons across events between customer groups (prospects, leads, new business applicants, and sales), in accordance with an embodiment.
Figure 10:
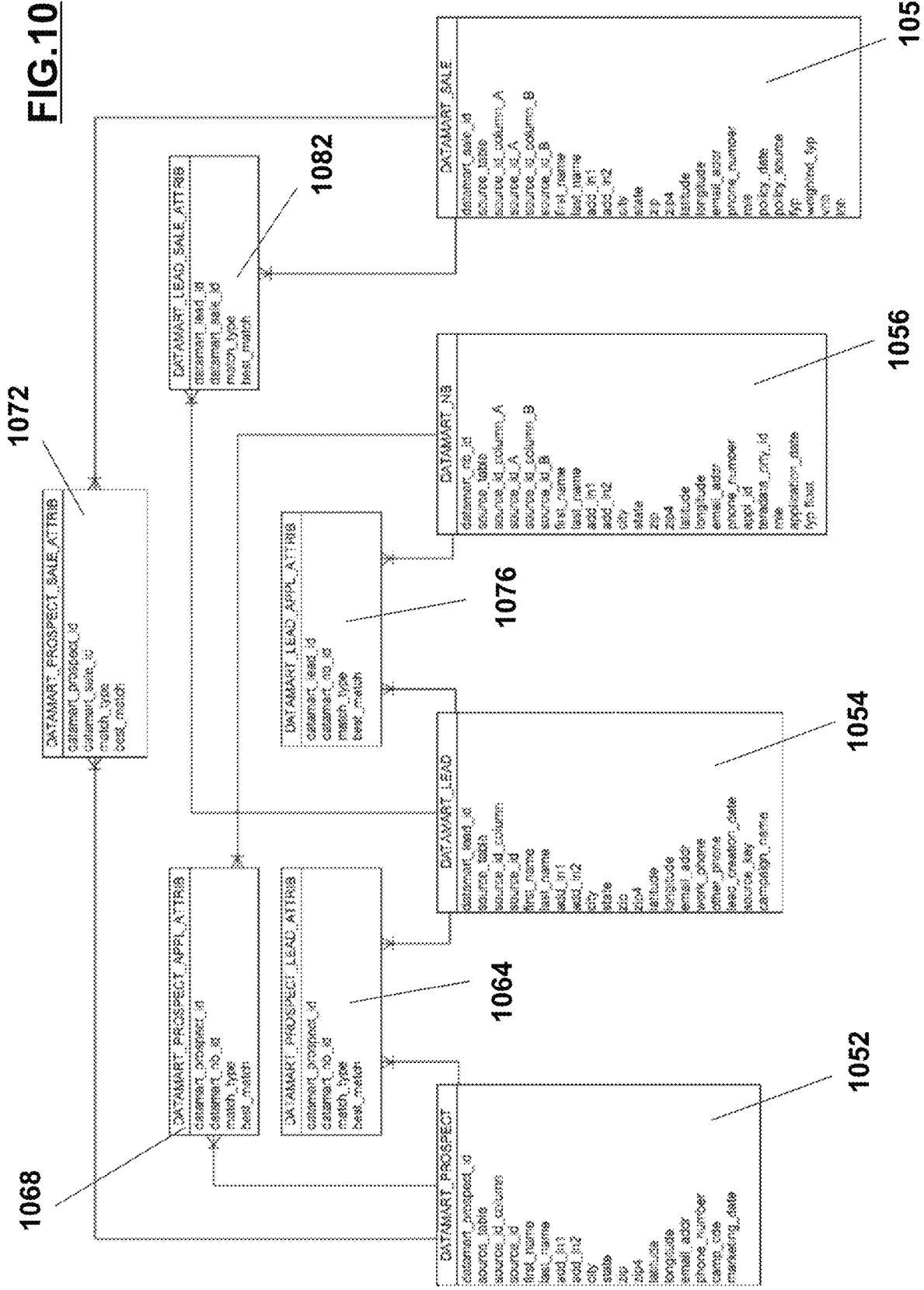
FIG. 10 is a schematic diagram of customer database event tables for customer groups prospect, lead, new business, and sale, and of tables for attribution between events, in accordance with an embodiment.

FIG. 2 shows an exemplary set of enterprise databases 200, an embodiment of enterprise databases 122 in FIG. 1. Enterprise databases 200 include the Lead Index 210, Customer Database 220, Leads Management System 230, Policies Database 240, and Advisor Bios Database 250. In an embodiment, the index contains indexed data extracted from a third-party demographics database 132, the customer demographics database 132. The lead index 210 is a source of demographics data for leads of the enterprise. In an embodiment, Customer database 220, also called Marketing Datamart, stores information on individual customers of the enterprise, associating these customers with one or more of the groups Prospects, Leads, New Business and Sales (also called Purchasers). Embodiments of the customer database are shown in FIGS. 8-10. Leads Management System 230 stores additional information on leads of the enterprise. Policies database 240 tracks relevant information related to policies of the enterprise sold, policy holders, and selling agents. This data can track attributes of policies, such as riders and face amount coverage, and can track customer profile information on the policyholder. Advisor Bios database 250 contains biographic information for all agents or advisors of the enterprise.

Figure 3:
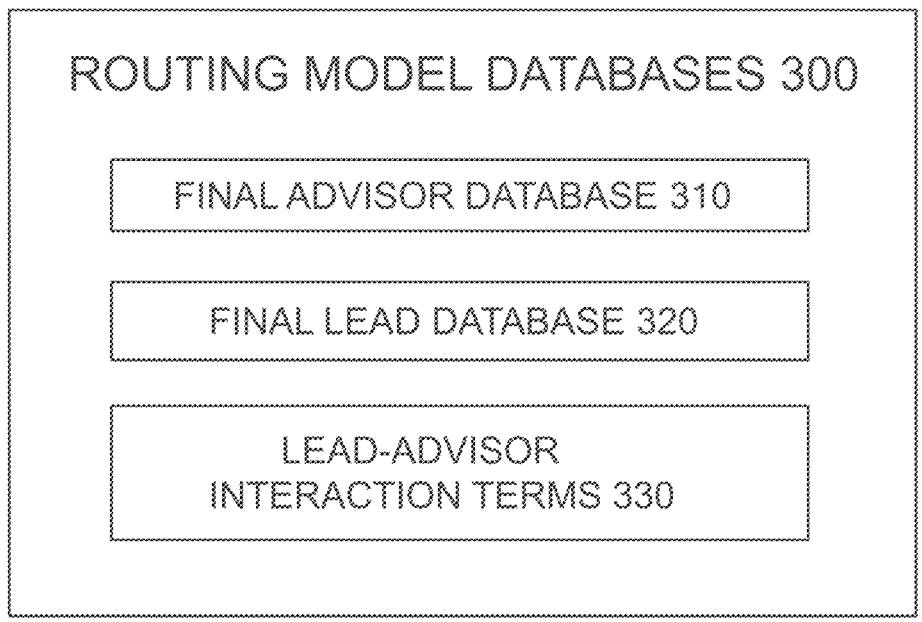
FIG. 3 is a block schematic diagram of routing model databases, in accordance with an embodiment.

FIG. 3 shows an exemplary set of routing model databases 300, an embodiment of routing model databases 124 in FIG. 1. Routing Model Databases 300 include a Final Advisor Database 310, a Final Lead Database 320, and Lead-Advisor Interaction Terms database 330. Routing model databases contain data concerning leads, advisors, and sales of the enterprise that have been extracted from various of enterprise databases 200, which data have been transformed for use in modeling methods of the present disclosure. Routing model databases are sometimes herein called final databases or final datasets, referring to completion of data transformation procedures to put these data in suitable form for modeling agent routing.

Predictive modeling module 110 models behaviors of leads such as likelihood that a caller will purchase a product offered by the call center, also herein called the likelihood of conversion. The predictive modeling module analyzes each inbound customer call using data associated with the inbound caller. Input data used in predictive modeling may include data contained in enterprise databases 122, and may include data from third-party databases 130. This input data also may include data derived from the retrieved data that has been transformed by analytical engine 104 in order to facilitate predictive modeling, such as routing model data 124, as described herein.

Predictive modeling module 110 builds both a regression model 112 and a tree-based model 116. In an embodiment, the predictive modeling module 112 trains a logistic regression model 116 with $l_1$ regularization on the full set of features of the database. Use of logistic regression for classification problems provides performance advantages over standard linear regression, because application of the logistic function to the raw model score maps the output precisely from 0→1 while providing a smooth decision boundary. In an embodiment, the logistic regression model with $l_1$ regularization utilizes LASSO (Least Absolute Shrinkage and Selection Operator), a regression analysis method that performs both variable selection and regularization to enhance prediction accuracy and ease of interpretation of the resulting statistical model.

$l_1$ regularization provides the benefit of simplifying the selection of features through the model training process by constraining features with lower correlation to have 0 weight. The general form for a linear model can be indicated as:

$$\hat{y}(w,x) = w_0 + w_1 x_1 + \ldots + w_p x_p$$

for $\hat{y}$ to be predicted from data points in the array x by learned coefficients w. The $l_1$ regularization is achieved by adding a term to the cost function, as follows:

$$\min_w \frac{1}{2n_{samples}} \|Xw - y\|_2^2 + a\|w\|_1$$

with regularization weight α. In an embodiment, the logistic regression model with $l_1$ regularization sets the regularization parameter a using cross-validation, with best-performing values typically around 0.005-0.01.

In another embodiment, regression model employs logistic regression with $l_2$ regularization, sometimes called ridge regression, according to the formula:

$$\min_w \frac{1}{2n_{samples}} \|Xw - y\|_2^2 + a\|w\|_2$$

In the $l_2$ regularization model, as in the $l_1$ regularization model, the regularization weight α is set by cross-validation. In an embodiment, a logistic regression model with $l_2$ regularization uses a backward feature selection procedure to select an optimal number of features. This feature selection procedure is the RFECV method for recursive feature elimination in Scikit-learn. (Scikit-learn is a software machine-learning library for the Python programming language, available at https://github.com/scikit-learn/scikit-learn).

In an embodiment, the tree-based model 116 is a random forests model. Random forests is a class of ensemble methods used for classification problems. Random forests models work by fitting an ensemble of decision-tree classifiers on sub-samples of the data. Each tree only sees a portion of the data, drawing samples of equal size with replacement. Each tree can use only a limited number of features. By averaging the output of classification across the ensemble, the random forests model can limit over-fitting that might otherwise occur in a decision-tree model.

In an embodiment, the tree-based model 116 uses the random forests model in Python's scikit-learn. In an exemplary embodiment, the tree-based model 116 uses the following parameters in the scikit-learn random forests model:
Maximum tree depth: 3 or ∞, set with max_depth.
Maximum number of features considered when looking for the best split: 3→6, set with max_features.
Minimum number of samples required to split a node of the tree: 2→11, set with min_samples_split.
Minimum number of samples to be a leaf node: 1→11, set with min_samples_leaf.
Number of trees in the forest: 100 or 200, set by n_estimators.
Whether to sample with replacement for the data seen by each tree: true or false, set by bootstrap.
Function to measure quality of a split: Gini or Entropy (information gain), set as criterion.

Predictive models 110 effect a degree of feature selection. In various embodiments, predictive models identify features that have the most pronounced impact on predicted value. Different types of models may identify different features as most important. Table 1 shows the top 15 features from the $l_1$ conversion model. The most important feature of this target is the expectant_parent_nominal variable, where a 0 corresponds to not expectant. This data indicates that non-expectant parents are less likely to buy.

TABLE 1

Features from $l_1$ conversion model

| Importance | Feature |
|---|---|
| −2.7125 | expectant_parent_nominal |
| −0.3126 | recent_divorce_nominal_0 |
| −0.2634 | credit_card_new_issue_nominal_0 |
| −0.1438 | gender_input_individual_nominal_0 |
| 0.1117 | socially_influenced_ordinal |
| 0.0890 | home_length_of_residence_interval |
| −0.0757 | likely_investors_nominal_0 |
| −0.0667 | vacation_travel_international_would_enjoy_ordinal_to_binary |
| 0.0637 | total_liquid_investible_assets_fin_ordinal |
| −0.0632 | new_mover_nominal_0 |

TABLE 1-continued

Features from $l_1$ conversion model

| Importance | Feature |
|---|---|
| −0.0518 | single_parent_ordinal_to_binary |
| −0.0517 | vacation_travel_time_share_have_taken_ordinal_to_binary |
| −0.0455 | investments_real_estate_ordinal_to_binary |
| 0.0438 | investments_stocks_bonds_ordinal_to_binary |
| 0.0429 | obtain_life_insurance_along_with_loan_mortgage_installment_payments_ordinal |

Analytical engine 104 can be executed by a server, one or more server computers, authorized client computing devices, smartphones, desktop computers, laptop computers, tablet computers, PDAs and other types of processor-controlled devices that receive, process and/or transmit digital data. Analytical engine 104 can be implemented using a single-processor system including one processor, or a multi-processor system including any number of suitable processors that may be employed to provide for parallel and/or sequential execution of one or more portions of the techniques described herein. Analytical engine 104 performs these operations as a result of the central processing unit executing software instructions contained within a computer-readable medium, such as within memory. In one embodiment, the software instructions of the system are read into memory associated with the analytical engine 104 from another memory location, such as from storage device, or from another computing device via communication interface. In this embodiment, the software instructions contained within memory instruct the analytical engine 104 to perform processes described below. Alternatively, hardwired circuitry may be used in place of or in combination with software instructions to implement the processes described herein. Thus, implementations described herein are not limited to any specific combinations of hardware circuitry and software.

Depending on a cluster or group of agents selected, and in some cases an individual agent selected, for a particular lead (e.g., during or after an inbound call from the lead), analytical engine 104 directs routing of the lead to agent module 150 to await connection to a group of agents or particular individual agent of the call center. In an embodiment, call routing module 150 includes a component 154 that routes the inbound call to one of multiple groups of agents of the call center. In FIG. 1, two clusters or groups of call center agents queues—first agent cluster/group 160 and second agent cluster/group 170—are shown. In some embodiments, the component 154 of agent routing module 150 routes the inbound call to a particular agent, such as an agent within one of the clusters/groups 160, 170. Routing leads to agents or groups of agents based on clustering of agents and based on agent routing models that use pre-processed lead data derived from data pertaining to leads, advisors, and sales data of the enterprise, represents a significant improvement over traditional methods of routing leads to advisors.

Inbound call management system 102 interfaces with an inbound telephone call receiving system and an outbound calling (e.g., customer call-back) system 140. System 140 is also herein called call receiving/outbound calling system, and is sometimes referred to by its component devices, e.g., an inbound telephone call receiving device and an outbound calling device. In customer management system 100, inbound/call-back management system 102 and call receiving/outbound calling system 140 may be integrated in a single computing platform. Alternatively, these systems may be based on separate computing platforms. In certain embodiments, the computing platform(s) are interfaced with computer-telephone integration ("CTI") middleware. In an embodiment, call receiving/outbound calling system 140 includes a telephony device that accepts inbound telephone calls through a telephony interface 141, such as conventional T1 or fiber interfaces. Call receiving/outbound calling system 140 accepts inbound telephone calls through interface 141 and obtains caller information associated with the inbound calls, such as Automatic Number Identification ("ANI") and Dialed Number Identification Service ("DNIS") information 145. ANI is a signaling system feature in which a series of digits, either analog or digital, are included in the call identifying the source telephone number of the calling device. DNIS is a telephone function that sends the dialed telephone number to an answering service. The DNIS need not be a telephone number associated with any physical location. Call receiving/outbound calling system 140 also includes an outbound calling device (e.g., telephone calling device) for placing call-backs or other outbound calls 180 to leads 190.

Call receiving/outbound calling system 140 may include an Automatic Call Distributor ("ACD") system 142; a Voice Response Unit ("VRU") system 144; a private branch exchange ("PBX") switch 146; a Voice over Internet Protocol ("VOIP") server 148; or any combination of such devices. In an embodiment, intrasite telephony access within the call center may be managed by a private branch exchange (PBX) switch 146. In an embodiment, PBX switch 146 operates in coordination with ACD 142 to distribute inbound calls to customer service stations of locally-networked call center agents. In further embodiments, inbound inquiries may include email or instant messages that provide inquiry information based on login ID, email address, IP or instant message address. In such an embodiment, the call center can gather additional information by an automated email or instant message survey response, which can be used to request various types of customer identifier data.

Customer identifiers for an inbound caller are used by agent routing management system 102 to retrieve or identify additional data associated with that customer. In an embodiment, a source of customer identifiers is Voice Response Unit ("VRU") system 144, which collects the customer identifiers through automated interaction with the customer. For instance, VRU 144 may query an inbound caller to collect customer identifiers information when ANI is not operative, e.g., when caller-ID is blocked. In an embodiment, a source of customer identifiers is third-party directory service 134. In an embodiment, directory service 134 provides agent routing management system 102 with additional caller identification information, such as name and street address, for inbound callers that are initially identified only by a telephone number.

Inbound telephone calls received through interface 141 are distributed to agent routing module 150 for routing to groups of agents 160, 170 or to individual agents within those groups, e.g., via operating telephony devices. In an embodiment, agents are associated with a sponsoring organization that sells or supplies products with the assistance of the call center. In an embodiment, call center agents generate leads by qualifying prospects and by promoting products of the sponsoring organization. In an embodiment, the enterprise generates sales of one or more product through advertisements that give a phone number to prospective customers, and the prospective customers call into the call center using this phone number.

In an embodiment, a sponsoring organization for customer management system 100 is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. In an embodiment of the system 100, the agents in the plurality of groups 160, 170 are licensed to sell insurance, and agent performance is commonly measured using conversion statistics.

In various embodiments, agents clustering module 103 of analytical engine 104 assigns agents of the enterprise to a plurality of groups or clusters of agents 160, 170 via supervised clustering 106, unsupervised clustering 107, or a combination of supervised clustering and unsupervised clustering. In various embodiments, agent routing models 105 generate agent routing assignments. In various embodiments, agent routing assignments include assignments of leads to agent clusters 160, 170, and assignments of leads to individual agents within agent clusters. In various embodiments, agent routing models 105 generate conversion scores used in agent routing assignments. In an embodiment, after agent clustering module 103 assigns agents of the enterprise to one of the plurality of clusters of agents 160, 170, agent routing models 105 assign that lead to an individual agent within the assigned group of agents. In various embodiments, agent routing models 105 include one or more aggregate conversion model 108, which predicts conversion without using agent clusterings as input to the model, and one or more cluster based model 109, which uses agent clusterings as input to the model.

In an embodiment, analytical engine 104 determines a conversion score for each pair of leads and advisors via an aggregate conversion model. In an embodiment, the aggregate conversion model determines conversion score independently of clustering analysis. In an embodiment, the analytical engine 104 assigns a lead to an individual agent via determination of the agent within the assigned cluster that has the highest conversion score for that lead (sometimes called greedy algorithm). In an embodiment, the conversion score is the mean of a predicted random variable describing the outcome from the model. In other embodiments, the analytical engine 104 applies Bayesian Bandits heuristics, such as Thompson sampling, to assign leads to agents based upon calculated probabilities that the assignments maximize cumulative expected conversion scores.

Thompson sampling samples from the likelihood that each cluster is best with respect to the model's uncertainty. In an example of Thompson sampling, cluster A has prediction with mean 0.4, standard deviation (SD) 0.2, and cluster B has prediction with mean 0.5, SD 0.1. The distributions of these variables overlap, and Thompson sampling draws an assignment from the likelihood that each cluster is optimal. Assuming that cluster A has a 30% chance of being optimal while cluster B has a 70% chance, Thompson sampling draws from the 30/70% probabilities to assign the lead. In contrast to assignment via the best mean prediction, in which cluster B receives the lead 100% of the time, Thompson sampling introduces a nonzero probability that cluster A receives the lead. Applicant has observed that Thompson sampling can collect data during model training that improves baseline model performance, and can improve performance in a production model.

In an embodiment, the call management system 100 monitors call-backs 180 by advisors to leads (e.g., returning inbound calls by the leads). In an embodiment, if an agent that has been assigned a lead by agent routing system 102 does not respond to the lead within predetermined criteria (e.g., within a given period of time), agent routing system 102 assigns the lead to another agent.

In an embodiment, call routing module 150 includes an agent routing reporting module 158. Agent routing reports may include reports of agent routing data to leads, and reports to agents of the call center. In various embodiments, reports to leads can enable leads to understand makeup of the agents within cluster generated by the agent routing system 102. For example, reports to leads can provide statistical information about agents within an assigned cluster, and can provide information about individual assigned agents. Reports to agents can enable agents to understand a particular clustering, and to examine the data that were used to assign agents to a cluster. This information can help advisors understand makeup of the leads assigned to each cluster generated by a clustering algorithm.

In an embodiment, the reporting module 158 routes updated graphical user interfaces (GUIs) generated by the agent routing management module 102. In an exemplary embodiment, the reporting module 158 routes updated GUIs that display histograms of key variables used to assign agents to clusters. In an embodiment, the agent routing reporting module is implemented on a customer relationship management (CRM) platform (not shown). In an exemplary embodiment, the agent routing reporting 158 interfaces with the CRM platform to display agent routing data to agents 160, 170, e.g., via dashboards displayed by the CRM platform. In an embodiment, the CRM platform provides users with an interface for case management and task management, and a system for automatically routing and escalating important events. In some embodiments, only agents assigned to a given cluster can view agent routing data pertaining to that cluster.

In an embodiment, the agent routing reporting module 158 displays agent routing data at client devices of leads. In an embodiment, the customer management system 100 initiates an ongoing communication session with client devices of leads and reporting module 158 displays a graphical user interface (GUI) presenting agent routing information. The ongoing communication session can include email, chat, texting, over-the-top messaging, or others. In various embodiments, agent routing data displayed at client devices of leads can include information about advisors within a cluster assigned to a lead, and information about an individual advisor assigned to a lead.

Figure 4:
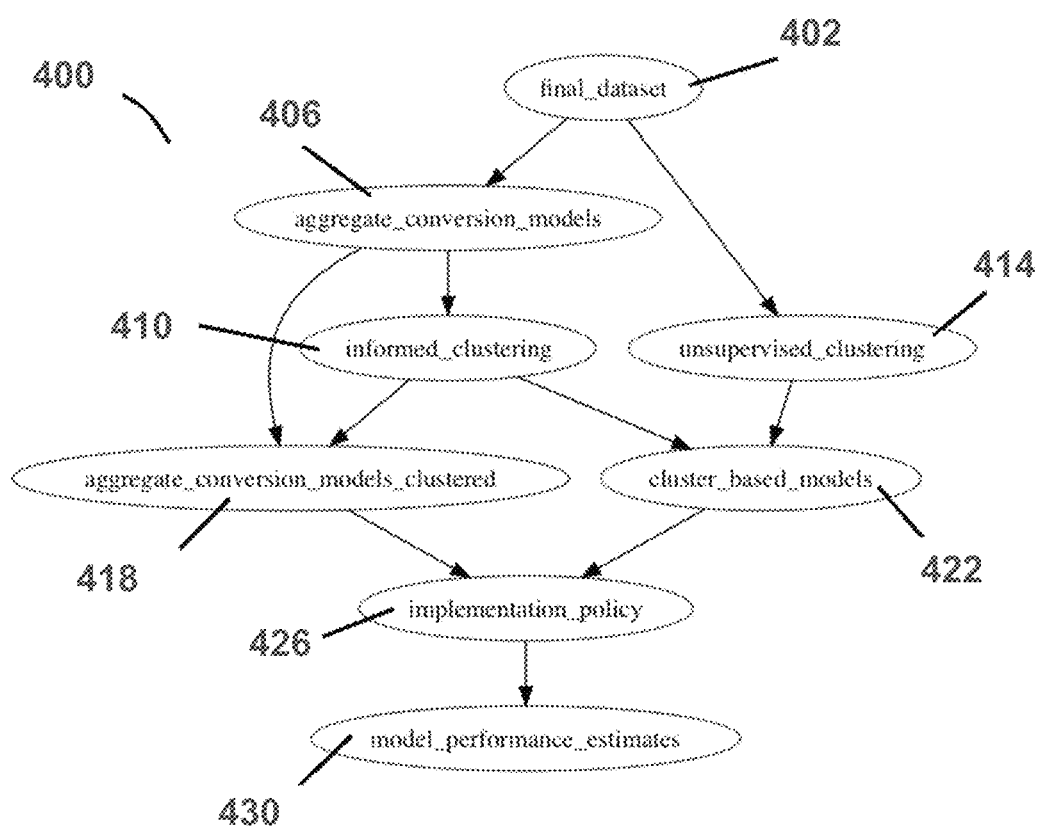
FIG. 4 is a schematic diagram of an agent routing process pipeline, in accordance with an embodiment.

FIG. 4 depicts an agent routing process pipeline 400. The process starts with a final dataset 402, such as the routing model databases 300 of FIG. 3. In an embodiment, the final dataset 402 is generated by the ETL (Extraction, Transformation, and Loading) process 500 of FIG. 5. Initial methods of the pipeline build an aggregate conversion model 406 on all leads, and perform unsupervised clustering 414 on the final dataset. The results of these methods are then fed into other models. An informed clustering analysis 410 is applied to the aggregate conversion models 406 to generate aggregate conversion models 418. The unsupervised clustering module 414 is applied to final dataset 402 to generate cluster-based models 422.

The aggregate conversion models 418 and cluster-based models 422 are feeds to an implementation policy 426, which determines routing 154 of leads to agent groups and/or to individual agents 154, and which generates reports 158 to agents 160, 170 and to leads 190. In an embodiment, in generating outputs implementation policy 426 considers a model-clustering pair. In an embodiment, agent routing process pipeline 400 including implementation policy 426 uses an "explore-exploit" framework for model training and for production models (also herein called live models). The agent routing process pipeline 400 predicts the rewards for each advisor cluster given the context of the lead. In an embodiment, an implementation algorithm of agent routing process pipeline 400 may consider some lead-cluster interactions, such as average cluster—lead age difference, in predicting awards.

The pipeline 400 generates performance estimates 430 of a live model from the output of implementation policy 426. In an embodiment, performance estimates 430 can be used in continuous training of the agent routing model. In various embodiments, agent routing model performance is measured both by the ability of models to predict conversion, and by the ability of models to provide differential scores across agent clusters. In an embodiment, the performance estimates measure success in the clustering by improvement in Area Under the Curve of the Receiver Operating Characteristic (AUROC), i.e., the area under the curve (AUC) of a receiver-operator curve (ROC). In another embodiment, prospective predictive models are tested for performance by measuring lift across deciles. Lift is a measure of the degree of improvement of a predictive model over analysis without a model. In various embodiments, performance estimates 430 use validation processes to approximate model performance using known data. These validation processes are used to develop improved models and thereby to increase conversion rates.

Figure 5:
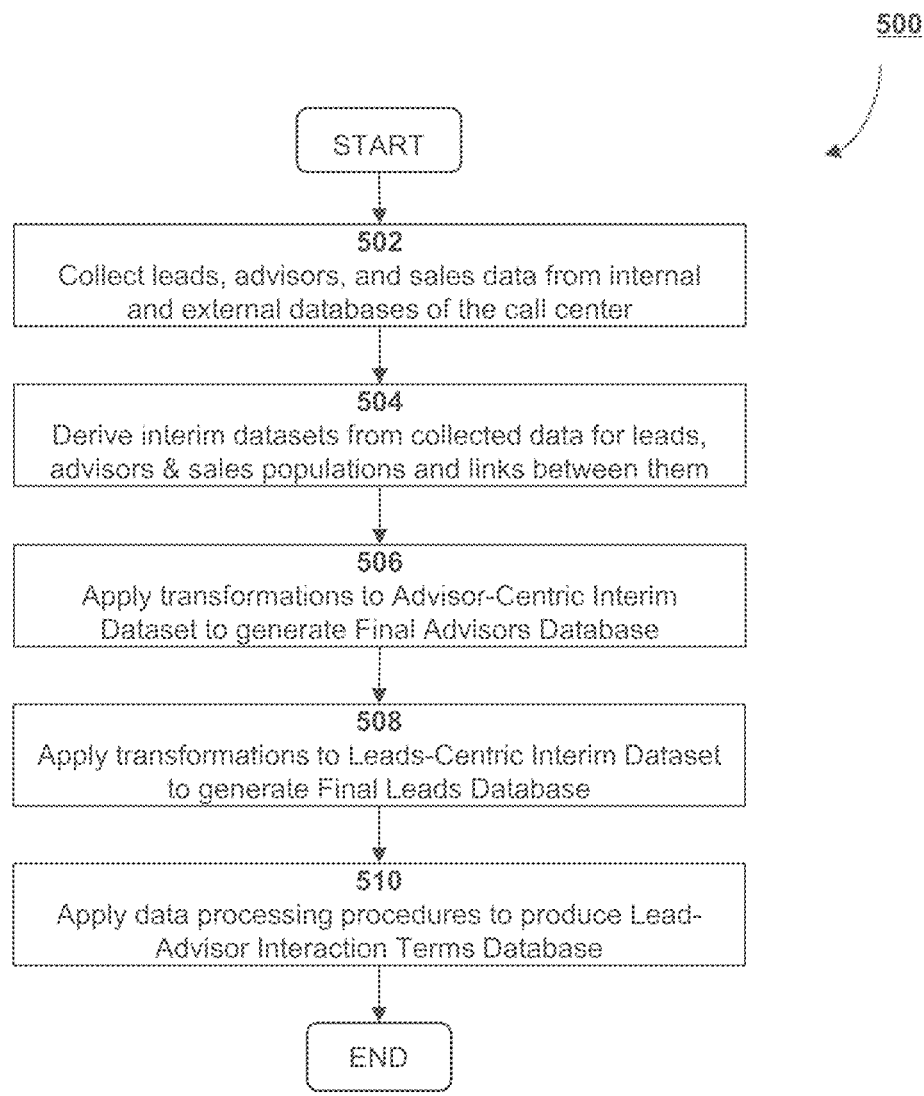
FIG. 5 is a flow chart diagram of processes for extracting data from various databases and for transforming the extracted data to generate model databases, in accordance with an embodiment.

As seen in the flow chart diagram of FIG. 5, method 500 collects and processes data from various databases of agent routing system 102 to derive a set of routing model databases 300. In an embodiment, process 500 applies ETL (data Extraction, Transformation, and Loading) processes to extract data from data sources of agent routing system 102, to perform transformations on the extracted data, and to load the transformed data into target data stores containing the routing model databases 300. As used in the present disclosure, data collection and processing procedure 500 is also called an extraction, transformation, and loading (or "ETL") procedure.

Step 502 collects data from various internal and external databases of the call management system 100. In an embodiment, data collected at step 502 include data for three populations, i.e., leads, advisors, and sales (also herein called purchasers or existing customers), as well as data pertaining to various links between these populations. In an embodiment, a primary source of data for all three populations— leads, advisors, and sales— is demographic data in one or more demographics database (which may include, e.g., external demographic database 132 and/or one or more internal databases 210, 220, 230).

In an embodiment, data for all leads and all sales, as well as the attribution between the two populations, are captured in Marketing DataMart tables 220. For example, marketing details for both leads and sales such as campaign, search term, assigned advisor can be obtained from Marketing Datamart database 220.

For advisors and sales, an additional source of data is internal Policies database 240, which includes the policy information for sales (purchasers), including the servicing advisor. Additionally, biographical data for advisors can be collected from internal Advisor Bios database 250.

Another category of data collected at step 502 describes links between the three populations. For example, sources include links between leads and sales based on leads-sales attribution data 1082 extracted from the Marketing Datamart (FIGS. 9, 10); links between advisors and sales extracted from servicing advisors and sales (purchasers) data in Policies database 240; and links between leads and advisors extracted from Leads Management System 230.

Figure 6:
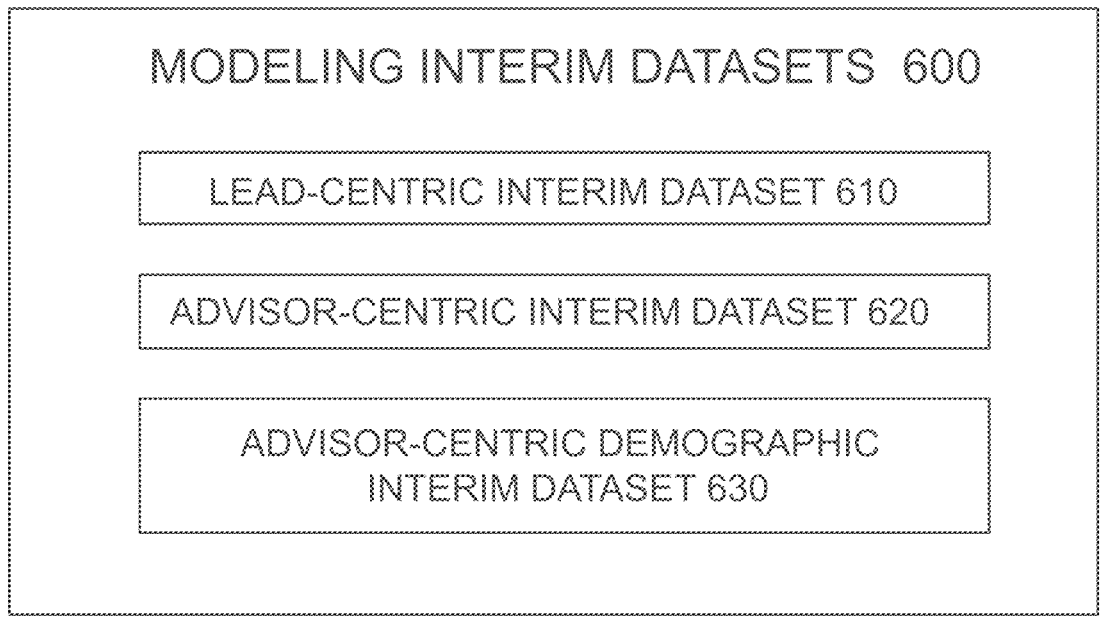
FIG. 6 is a block schematic diagram of modeling interim datasets, in accordance with an embodiment.

Step 504 of ETL procedure 500 derives several interim datasets from the data collected at step 502 for the populations and the links between them. In an interim dataset embodiment shown in FIG. 6, step 504 derives three interim datasets 610, 620, 630 from the collected data.

A Leads-Centric interim dataset 610 contains a lead index 210 record, any assigned advisor, and conversion status for each lead. In an embodiment, Leads-Centric interim dataset 610 includes only those records which have both a match and an assigned advisor. Dataset 610 is leads-centric because it contains all leads, but not all advisors or all sales.

An Advisors-Centric Sales interim dataset 620 contains Policies database data 240 and lead index data 210 for all policy holders in the book of business of each advisor. Advisors-Centric Sales interim dataset 620 is advisors-centric since it contains information available to agent routing system 102 concerning advisors of the enterprise. Dataset 620 is also called book of business data or book of business table in the present disclosure. In an embodiment, book of business table 620 joins data for all advisors of a sponsoring enterprise for the agent routing system 102 to all sales associated with the advisors.

An Advisors-Centric demographic interim dataset 630 contains demographic data for every advisor of the enterprise.

ETL process steps 506, 508, and 510 apply various transformations to the modeling interim datasets 610, 620, 630, and load the transformed data into Routing Model Databases 300. In an embodiment shown in FIG. 3, the Routing Model Databases 300 include a Final Advisor Database 310, Final Lead Database 320, and a Lead-Advisor Interaction Terms database 330. In various embodiments, ETL procedures are applied to transform data into Routing Model Databases 300 in training the agent routing system 102 (e.g., agent routing model 400).

Step 506 applies various data processing procedures to the Advisors-Centric interim datasets 620, 630, resulting in Final Advisor Database 310. In an embodiment, step 506 includes a first data processing procedure that "flattens" the book of business data 620 by performing aggregation functions to this data.

In an embodiment, aggregation or flattening functions applied to book of business data 620 include the following functions:

Nominal: flatten_nominal( ) takes a dataframe representing the book of business for a single advisor, and returns a single row that has the fraction of each values from each column as new columns. For example, with columns x1 and x2, including the values a, b, and c, d, respectively, flatten_nominal( ) returns a single row x1_a, x1_b, x2_c, x2_d, with x1_a being the fraction of 'a' in x1, etc.

Numeric statistics: flatten_numeric( ) returns the mean for each numeric column, df.mean(axis=0).

Numeric bucket counts: flatten_even_buckets( ) takes numeric columns, and outputs the fraction in each bin of the given bin ranges. This function calculates a range and a number of buckets for each column it will flatten. For example, with column x1, having values from −10 to 100,000, the function could pass a range of 0⇒80,000, such that values outside the range will be placed into the end buckets; and n=8 buckets. The output will be a row with columns x1_0_10000, . . . , x1_70000_80000 with the fraction of values falling into the buckets. An example of returned column values based on this function is 'bob_fyp_log_10_0_1', 'bob_fyp_log_10_1_2', etc.

In various embodiments, these flattening transformations turn the data in the book of business table 620 into a set of records in which a single record contains the aggregated book of business data for a given advisor. In an embodiment, the flattened dataset includes the columns Product Type, Income, and FYP (First Year Premium) of the policies for each policy owner in the book of advisor's business. By transforming book of business data 620 that normally exist in non-flat (e.g., nested) data structures, the flattening transformations expedite the application of advisor routing models (e.g., agent routing process pipeline 400) to this data on demand, such as when routing an inbound call 141 from a lead to an advisor in real time.

In an embodiment, the step 506 of transforming the Advisors-Centric Dataset includes a second data processing procedure of joining the flattened book of business data to the Advisors-Centric Demographic Dataset 630 that includes all demographic information for each advisor. In an exemplary embodiment, the Final Advisor Database 320 resulting from step 506 includes more than 100 columns of flattened book of business data, and more than 300 columns of demographics data, for every advisor.

Figure 7:
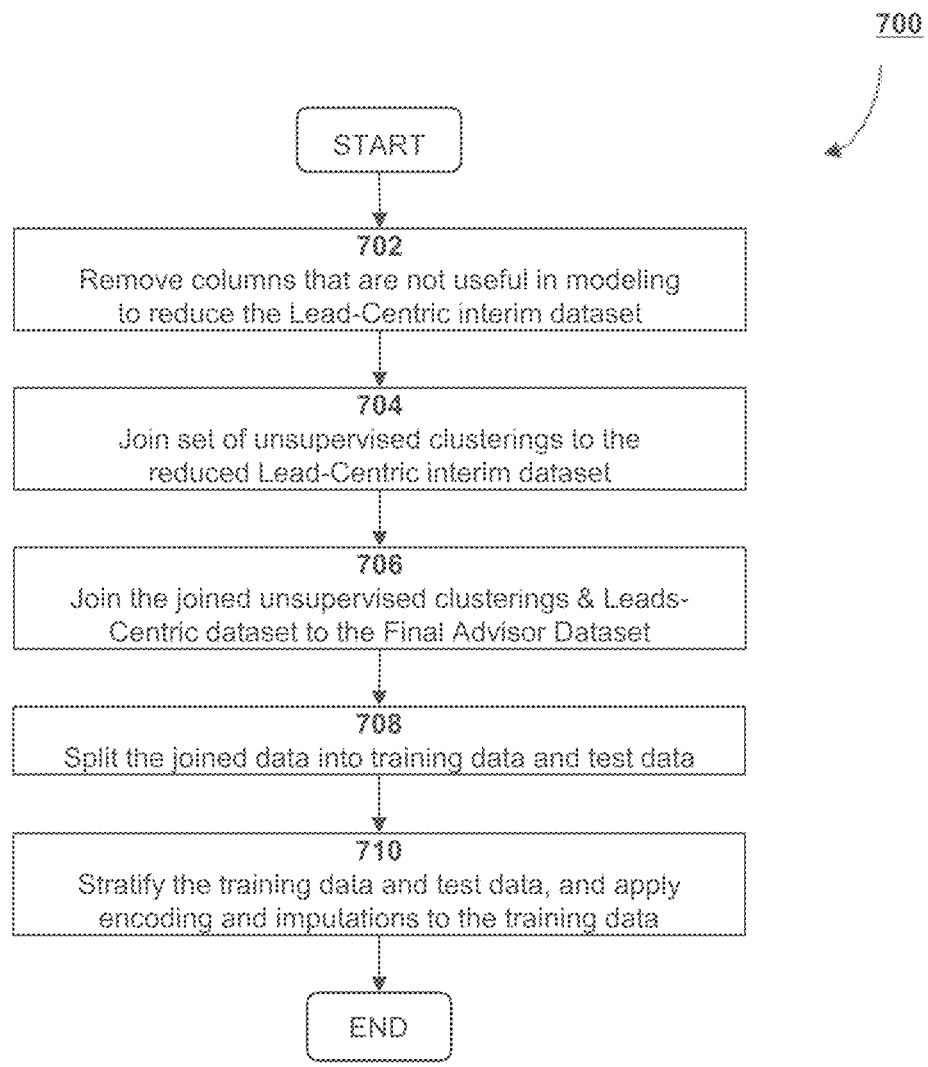
FIG. 7 is a flow chart diagram of miscellaneous data transformation procedures in a process for transforming a leads-centric interim dataset into a final lead database, in accordance with the embodiment of FIG. 5.

Step 508 includes various data processing procedures for the Leads-Centric interim dataset 610, resulting in a Final Lead Database 320. In an embodiment shown in the method 700 of FIG. 7, a first step 702 of the process 508 removes all columns from Leads-Centric interim dataset 610 that are not useful in modeling, such as database IDs, and information like name, address, etc. This process then 704 joins a set of unsupervised clusterings for advisors, such as five unsupervised clusterings. In an embodiment, step 704 includes a random cluster assignment. Step 706 joins the unsupervised clusterings/Leads-Centric dataset resulting from step 704 to the Final Advisor Dataset generated at step 506, thereby providing the full advisor record for each lead.

Final step 708 carries out miscellaneous data processing functions. In an embodiment, at step 708 the joined data from step 706 is split into training data (training observations) and test data (test observations). In an embodiment, at step 710 the training data and test data are stratified to provide a full dataset on advisors, then a stratified split on sale labels. In an embodiment, categorical features are reformatted via one hot encoding for improved performance with regression algorithms. In an embodiment, step 708 applies imputations to variables of the training data, such as medians for continuous/interval/ordinal and 0 otherwise. In an embodiment, step 708 drops columns from the training data that are determined by the imputation model to have excessive missingness.

In an exemplary embodiment, the training data set comprises around two-thirds of the pre-processed dataset of joined lead-advisor data, and the test data set comprises around one-third of the joined dataset. Model datasets may have populations in the hundreds of thousands or millions of individuals. Filtering techniques are applied to eliminate false data and for de-duplicating, reducing the number of records but significantly improving quality of model datasets. In an embodiment, the training data and test data are employed in cross-validation of expected conversion scores across different training models, clusterings, and lead assignment model. In various embodiments, an $l_1$ regularization model fits a regularization hyperparameter using three folds for cross-validation across model-cluster-assignment algorithm triplets.

The final step of FIG. 5, Step 510, applies data processing procedures to produce the third of the Routing Model Databases 300, Lead-Advisor Interaction Terms database 330. Lead-Advisor Interaction Terms database 330 includes the full advisor attributes for each lead, and step 510 adds to this data features that have been determined to be predictive of differential conversion during model training. In an embodiment, this step employs a limited number of predictive features, such as Gender match (0/1 for match); Gender match nominal (M:F, M:M, F:M, F:F); Age difference; normalized mean FYP (first year premium); and normalized Income.

In various embodiments, aggregate conversion models of the present disclosure predict conversion without considering clustering. In various embodiments, aggregate conversion models use lead features only, lead-advisor interaction features, or both lead features and lead-advisor interaction features, as inputs. Models that use advisor features provide a different conversion score for every advisor given the same lead, hence can score each lead against all agents that have the appropriate data. For the binary target, the conversion model may apply, e.g., logistic regression 112 with bucketed features, logistic regression 112 without bucketed features, Random Forest 116, and gradient boosting, among other methods.

The methods of the present disclosure model conversion rates and other factors that may determine which cluster of advisors and/or which individual advisor is the "best" match to a given lead. There are various challenges in modeling these factors based on modeling data for the advisors, leads, and sales of an enterprise. A significant number of agents may have a sales history that includes a very limited number of, or even no, lead conversions. Even for advisors who do have lead data, this data typically does not indicate directly which advisor is best because the data does not include outcomes of the same lead going to each of the advisors. Thus, typically a predictive model cannot directly evaluate whether the outcome would have been different if a particular lead went to a different advisor.

To mitigate these limitations in the modeling data, agent routing models of the present disclosure, such as agent routing pipeline 400 of FIG. 4, cluster advisors in order to increase the available data concerning advisor groups, as opposed to individual advisors. In various embodiments, the clustering of advisors into groups employs two broad approaches, unsupervised clustering and supervised clustering. In the present disclosure, supervised clustering is also called informed clustering. These respective clustering approaches employ different machine learning techniques.

In an embodiment, a clustering analysis determines a clustering vector for each of the advisors of the enterprise from flattened, enriched advisor data in the Final Advisor Database. In an embodiment, the clustering analysis clusters each of the advisors of the enterprise into one of the plurality of advisor clusters based on degree of similarity of a clustering vector. In an embodiment, the clustering analysis determines a clustering vector for each of the advisors of the enterprise via advisor attributes selected from features of the Final Advisor Data. In an embodiment utilizing simple demographic attributes, the weighted advisor attributes comprise advisor gender and advisor age range (e.g., male and female genders, and five age range buckets, providing ten broad demographic groups). In another embodiment, the advisor attributes comprise weighted features from the flattened book of business data for the agent, such as average first year premium, total policies, and distribution of policy types.

In an embodiment, the clustering vector is one or more of a connectivity function, a central vector, a graph partition, and a density function. In an embodiment, the clustering analysis is selected from one of more of Gaussian Mixture Model (GMM), k-means, spectral clustering, principal component analysis (PCA), and density-based clustering (such as density-based spatial clustering of applications with noise, DBSCAN).

In an embodiment, in furthering the overall goal of measuring differences in conversion between clusters, supervised clustering 410 builds advisor clusters that achieve differences in predicted conversion between clusters. In an embodiment, supervised clustering uses aggregate conversion models 406 for all leads derived from the final dataset 402. In an embodiment, the aggregate conversion models 406 generate different scores for each agent, given a lead. In an embodiment, supervised clustering 410 uses these scores used to build clusters by clustering agents on their scores for all the leads in the data. In another embodiment, the model assigns scores to a fixed clustering by considering the scores for all of the agents in each cluster for the given lead.

In an embodiment, an unsupervised clustering method 414 utilizes the flattened book of business data joined to agents' demographic data in Final Advisor Database 310, which includes more complete information about all advisors. The unsupervised clustering classifies advisors into groups based on similarity of clustering vectors.

In an embodiment, the method of the present disclosure selects a triplet of clustering analysis, cluster model, and aggregate assignment model following cross-validation of predicted conversion scores. Methods of the present disclosure use simulation processes (a replayer) to validate expected performance from a model in production, since the system lacks complete data for evaluating outcomes, i.e., a single lead going to all of the advisors and advisor clusters. The replayer performs tests on a subset of modeling data for which actions align with the actions taken in the data. In various embodiments, for each clustering analysis, cluster model, and aggregate conversion model, the replayer examines some or all of the following variables:

Assignment distribution:
  Model
  Historical
  Model in leads/advisor
Ranks for all leads for each cluster
Ranks for all clusters for each lead
Raw model scores for all clusters for each lead
Calibration assessment
  Model
  Historical
  Model in leads/advisor Assignment distribution data show assignments made by the model, for both historical and predicted data. Data on ranks for all leads for each cluster may be plotted to show which clusters get top ranks. In an embodiment, this data is plotted to show the distribution of clusters in first place— the same as the assignments plot— as well as the distribution for second place and subsequent places. In an embodiment, the data on raw model scores by cluster for each lead includes data for every lead, not just for assigned leads.

Calibration assessment data show total calibration for the model, within cluster. In an embodiment, this data uses the leads that actually went to the cluster to assess the calibration.

FIG. 8 is an architecture of a customer database 800, representing an embodiment of the customer database 220 of FIG. 2. Customer database 800 is an internal database of the sponsoring organization of the call center or other enterprise. Customer database 800 stores information on individual customers of the enterprise, associating these customers with one or more of the groups Prospects 802, Leads 804, New Business 806 and Purchasers (Sales) 808. In the present disclosure, customer database records that identify individual customers of the enterprise, such as by name and phone number, are sometimes called "enterprise customer records." Customer database 800 includes links between each customer group and each of the other groups. These links between customer groups are sometimes herein called attributions. There are unique keys 812 between Purchasers (Sales) and each of the other data stores; a unique key 814 between Prospects 802 and Leads 804; a unique key 816 between Prospects 802 and New Business 806; and a unique key 818 between Leads 804 and New Business 806. In addition, customer database 800 tracks event data for customer-related activities, such as promotional activities, customer-prospecting activities, and call center CRM activities. Customer database 800 joins customer information across these four groups, as well as attributions and events data, in order to better match call center resources to customer needs, evaluate marketing and call center activities, build stronger models, and generate useful reports.

Customer database 800 employs attribution processes for tracking customers across events in customer acquisition and marketing. The objective of attribution is to track people across events, i.e., prospects, leads, applications and sales. Customer database 800 uses exact matching of personal details in order to determine which prospects may have become leads, submitted new business applications and/or bought products; and which leads may have submitted new business applications and/or bought products. In an embodiment, customer database 800 additionally employs matching algorithms for matching personal details with lead data retrieved from third-party demographics databases, such as the demographics database 132.

The flow chart diagram of FIG. 9 shows attribution processes for tracking persons across events between the customer groups. FIG. 9 shows four customer groups, herein sometimes called "customer events," or alternatively, "customer event data": prospects 902, leads 904, applications 906 and sales 908. An individual customer can follow several different paths. For example, the customer might be a prospect who goes straight to a sale; might go through the leads pipeline; might submit an application but never buy the product, etc. Events also can include "activity events," such as promotional activities, customer-prospecting activities, and call center CRM activities. Customer database data tracking such activity events are sometimes herein called activity events data.

In an embodiment, events tracked by Customer database 900 include pairs of events consisting of an event that occurs earlier in time (also herein called prior event; e.g., event A) and an event that occurs later in time (also herein called subsequent event; e.g., event B). Attribution serves two primary functions. The first function is to trace all instances of a prior event A to see where these instances ended up. An example of this function is: "Find all leads, applications and sales that resulted from prospecting activity on X date." The second function is to determine, for any record of a subsequent event B, which instance of event A most likely caused event B. An example of this function is: "Which prospecting activities were responsible for TERM product sales this month?"

Each arrow of FIG. 9 represents one of five attribution processes 912, 914, 916, 918, and 920. The illustrated embodiment does not include an attribution between applications and sales, because tracking between them is very simple. In another embodiment, the attributions would include an attribution between applications and sales. Each arrow is numbered (1, 2, 3, 4, or 5), representing the order in which these attribution processes are run. In an embodiment, each attribution process carries out the following steps, in order: (1) Match records between event A and event B, where event B occurs later in time. For example, in the prospect to leads attribution 912, prospect is event A and leads is event B; (2) Filter matches based on a time limit determined by business rules; (3) Determine the best match, i.e., the single record from event A that most likely led to each record from event B; and (4) Load unique best matches to the attribution table, updating the historical table.

FIG. 10 is a schematic diagram of customer database event tables for the customer groups prospect, lead, new business and sale, and of attribution tables between events. Customer database event tables pool all prospects, leads, applications and sales across the enterprise into four standardized tables 1052, 1054, 1056, 1058. In an embodiment, prospect events data include, e.g., camp_cde (code of the marketing campaign that targeted the prospect), and marketing_date (earliest known date for the prospect). In an embodiment, leads events data include, e.g., lead_creation_date (earliest known date for the lead), and source_key (data that identifies the lead's corresponding prospect, where applicable). In an embodiment, new business events data includes, e.g., role (role of the person in the record has on an insurance policy, such as owner, insured, or payer), and fyp (first year premium). In an embodiment, Sale events data include, e.g., policy_date (earliest known date for the policy), and vnb (value of new business).

In an embodiment of the system of FIG. 2, various data in customer database 220 are also stored in other internal databases 120 of the enterprise. The latter databases may act as source systems for customer database 220. Referring again to FIG. 10, customer database records may have values in the columns source_table, source_id_column, and source_id, indicating how to access information in the source system.

Attribution creates attribution tables by applying rules to the customer database event tables. The attribution tables 1064, 1068, 1072, 976, and 1082 of FIG. 10 provide the basic data representing the relationship between each pair of events 1052, 1054, 1056, 1058. In addition, the customer database 1000 can build overall tables that aggregate all the relationships between prospect, lead, new business, and sales. For example, if a prospect is attributed to a lead, which in turn is attributed to a sale, an overall table would represent these relationships in a single row. In various embodiments, customer database builds reports via overall tables that apply analytics to select data using one or more of attribution tables 1064, 1068, 1072, 1076, and 1082. In various embodiments, the analytics include criteria based on activity events.

In an example, the customer database 1000 builds a report to answer the question: "What is the response rate for the Term to Perm campaign?" The customer database selects data using the marketing.datamart_prospect_lead_attrib table 1064. The customer database applies analytics to focus on the Term to Perm marketing campaign, counting the number of leads generated from the total prospects. In another example, the customer database 800 builds a report to answer the question: "What is the conversion rate for the Retirement campaign?" The customer database selects data using the marketing.datamart_prospect_appl_attrib table 1068. The customer database applies analytics to focus on the Retirement marketing campaign, counting the percentage of applications generated from the total prospects.

In an embodiment, conversion rates calculated by the report function of customer database 800 are input data used in conversion scoring (e.g., conversion scores of leads-advisor pairs) in the methods of the present disclosure.

Example 1: A first example of an unsupervised clustering was implemented in Python. The procedure built individual level advisor models with 11 regularization (LASSO regression), in which the positive target for each advisor was the advisor's book of business. The negative target was a random sample of books of business of other advisors approximately equal in size to that of the advisor, with the dataset being the data for each of their clients. The models were built by taking each advisor's clients in the policies database 240, matched to the lead index 210, with ~40% match. Each model was trained to predict the advisor's clients from a pool that also include randomly sampled clients from other advisors.

From more than 600 coefficients in the models for each advisor, the procedure selected the 100 coefficients that had the most nonzero entries across all advisors. The procedure then performed clustering using a Gaussian Mixture Model on the logistic regression coefficients of advisor-level models. This process identified 19 advisor clusters. Other unsupervised heuristics such as k-means, spectral clustering, and DBSCAN were tested, but the Gaussian Mixture Model was observed to provide best results.

Example 2: A second unsupervised clustering was implemented in R. This procedure built features from the book of business for each advisor. The features included the distribution of races, income, education, employment, and product ownership, sourced both from the lead index 210 and from the policies database 240. Unsupervised clustering heuristics using a Gaussian Mixture Model (GMM) were applied to a single vector for each advisor based on these features. Other unsupervised heuristics such as k-means, and Gaussian Mixture Model applied after principal component analysis (PCA), were tested, but the Gaussian Mixture Model was observed to provide best results.

Example 3: In a third example, a supervised clustering was applied with the overall goal of increasing conversion by routing to specific advisors/advisor groups. This procedure used iterative methods in a model that used the cluster as input (i.e., starting with the above clusters and improving them), and that clustered advisors based on the similarity of their conversion likelihood for historical leads.

Generalized Linear Mixed Model (GLMM) models were then trained using the GMM advisor clustering of Example 1 as an initial clustering, with the advisor cluster representing a random effect on conversion. In an embodiment, the models apply a Generalized Linear Mixed Model with a logistic link function, to provide binary outputs (1 or 0 for sale vs. no sale). The linear model has the following form, in which the observations Y are conditional on the mixed effects, which are unconditional:

$$(y|B=b) \sim \mathcal{N}(X\beta+Zb, \sigma^2 I)$$

$$B \sim \mathcal{N}(0, \Sigma_\theta)$$

In this formula:
Y (shape N×1) is a column vector of outcomes,
B are the random effects variables (with b\ in B),
X (shape N×p) is a matrix of p predictor variables,
β (shape p×1) is a column vector of the fixed-effects regression coefficients,
Z (shape N×q) is the random complement to the fixed X,
Σ (shape 1×1) is the common scale parameter,
$\Sigma_\theta$ (shape q×q) is the random effects variance-covariance matrix.
For the sizes:
N: number of observations
p: number of fixed effect variables (including intercept)
q: number of random effect variables (including intercept)
    *number of levels of grouping factor.

The GLMM models are predicated on the assumptions that lead data can be grouped by advisor clusters, such that similar leads are included in the same cluster, and the differences between these groups can be modeled using random effects. Best model performance, quantified by Area Under the Curve of the Receiver Operating Characteristic (AUROC), was observed in applying the GLMM model to advisor features that meaningfully predict conversion differences between the clusters. It was observed that clustering is most effective if the random effects (the random slopes and random intercept in the GLMM model) improve the model's ability to predict conversion. Variance in these random slopes improved the predictive value of the model, measured by improved values of AUROC.

Example 4: In a fourth example, a second supervised clustering was applied with the overall goal of increasing conversion by routing to specific advisors/advisor groups. As in the third example, the procedure used iterative methods in a model that used the cluster as input (i.e., starting with the above clusters and improving them), and that clustered advisors based on the similarity of their conversion likelihood for historical leads.

In this second supervised clustering procedure, a model of conversion directly informed the advisor clusters. The procedure took the output of an aggregated conversion model that includes interactions terms between leads and the leads' assigned advisor. This aggregate conversion model predicted sales, with no input for clustering. Since in this model each advisor received a different score for a given lead, each advisor had a collection of scores for all of the leads. The model clustered advisors that had similar scores for each lead.

Example 5: Performance estimates of agent routing models from the output of an implementation policy were measured both by accuracy of models in predicting conversion, and by propensity of the models to provide differential scores by cluster. Model performance was measured via AUROC resulting from applying the models to a validation data set. The best-performing model employed Regularized Logistic Regression with Interactions and the GMM clustering analysis of Example 2.

Figure 11:
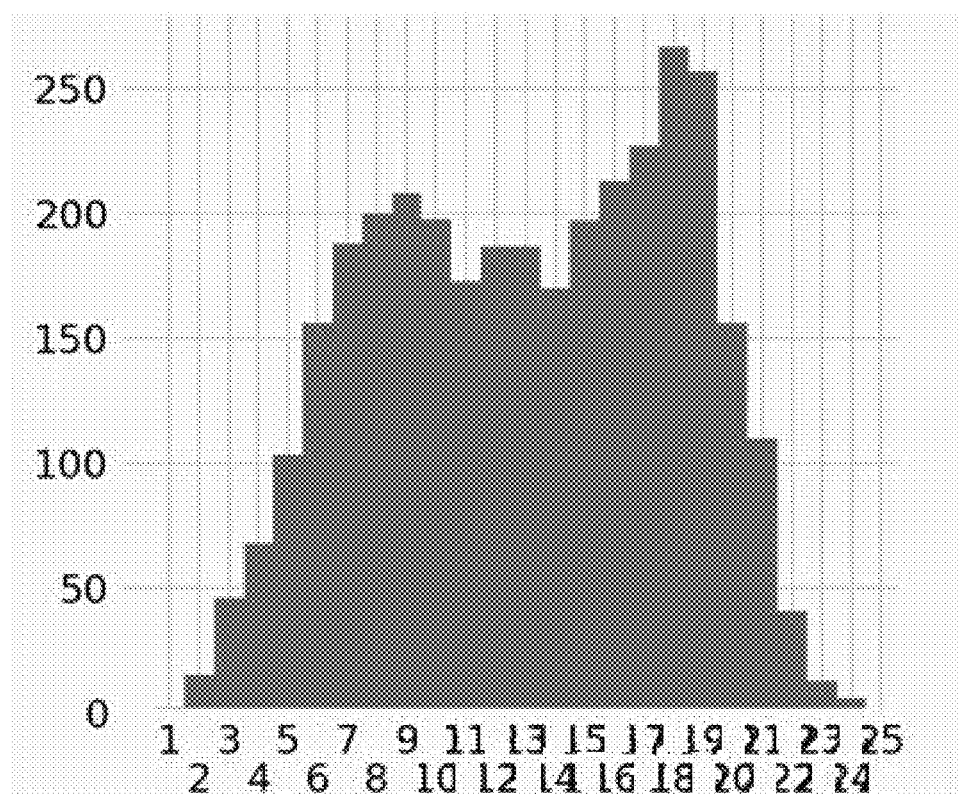
FIG. 11 is a graph of ranks-by-cluster for each lead for a given cluster, based on a greedy assignment algorithm.
Figure 12:
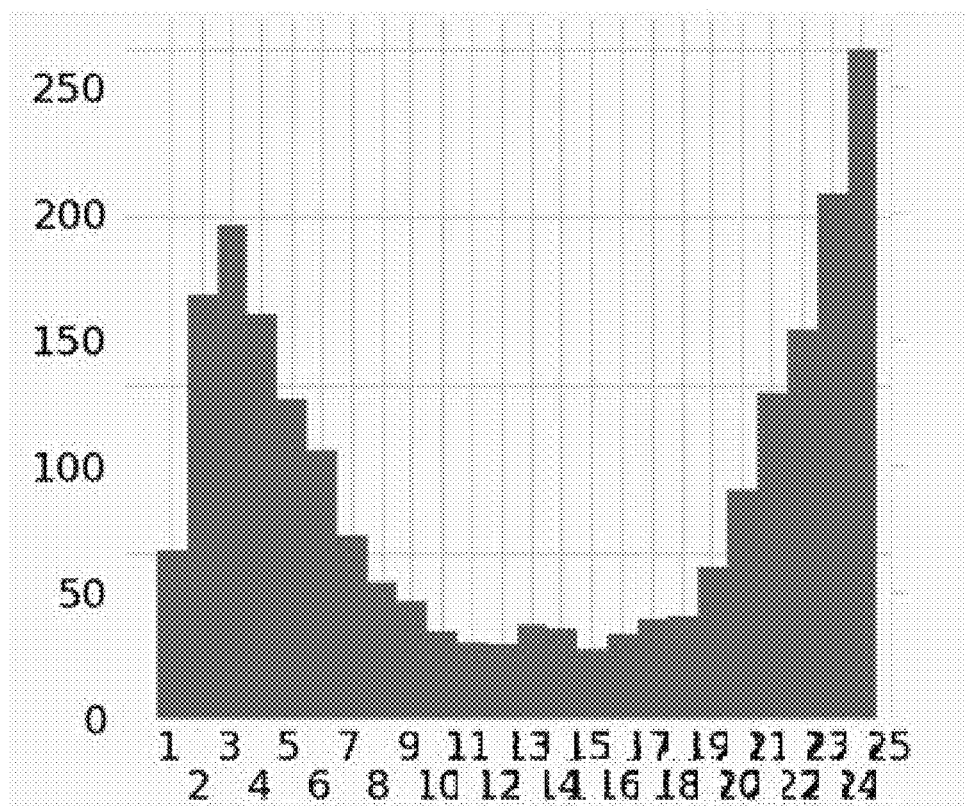
FIG. 12 is a graph of ranks-by-cluster for each lead for a given cluster, based on a greedy assignment algorithm.

Example 6: FIGS. 11, 12 show plots of ranks-by-cluster for all leads for respective clusters, based on a greedy assignment algorithm. FIG. 11 shows a plot of ranks-by-cluster for each lead for cluster #1, while FIG. 12 shows a plot of ranks-by-cluster data for each lead for cluster #2. If any lead for a cluster has a first place rank, that lead is assigned to the cluster in question.

Figure 13:
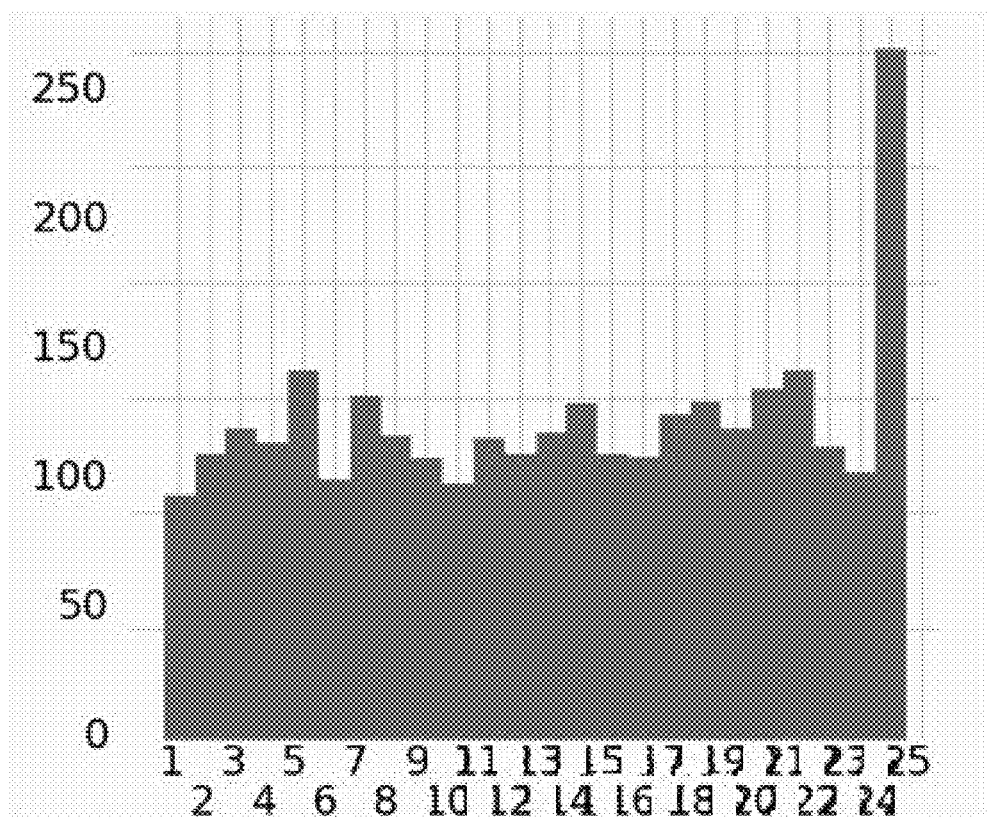
FIG. 13 is a graph of ranks-by-cluster for each lead for a given cluster, based on a Thompson sampling assignment algorithm.

Example 7: FIG. 13 shows a plot of ranks-by-cluster for all leads for cluster #3, based on a Thompson sampling assignment algorithm. Because of stochasticity introduced by Thompson sampling, cluster #3 includes a lead with a first place rank. In an embodiment, most or all other clusters with leads assigned by Thompson sampling also include a lead with a first place rank.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits and algorithm steps described in connection with the embodiments disclosed herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory, computer-readable, or processor-readable storage medium. The steps of a method or algorithm disclosed here may be embodied in a processor-executable software module which may reside on a computer-readable or processor-readable storage medium. A non-transitory, computer-readable, or processor-readable media includes both computer storage media and tangible storage media that facilitate transfer of a computer program from one place to another. A non-transitory, processor-readable storage media may be any available media that may be accessed by a computer. By way of example, and not limitation, such non-transitory processor-readable media may comprise RAM, ROM, EEPROM, CD-ROM, or other optical disk storage, magnetic disk storage, or other magnetic storage devices, or any other tangible storage medium that may be used to store desired program code in the form of instructions or data structures, and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

What is claimed is:

1. A processor-based method comprising:
executing, by a processor, a predictive machine learning model configured to determine an assigned agent cluster for each lead record of a plurality of lead records stored in a lead model database, by applying a combination of an unsupervised clustering, a supervised clustering, and an aggregate conversion model, to lead model data representative of leads and agent model data representative of agents, the predictive machine learning model outputting a plurality of agent clusters and sales conversion scores representative of a likelihood that respective leads will accept an offer to purchase a product,
wherein execution of the aggregate conversion model using the agent model data as input generates a score for each of the agents and for each lead as output, the scores provided as input to the supervised clustering to generate the plurality of agent clusters for the agents,
wherein the predictive machine learning model is continually trained using updated lead model data and updated agent model data;
wherein the unsupervised clustering in conjunction with the supervised clustering clusters each of the agents into one of the plurality of agent clusters; and
running, by the processor, the predictive machine learning model on demand to update and display, by a display device in operative communication with the processor, a graphical user interface including information representative of the plurality of agent clusters and assignments of respective leads to respective agent clusters within the plurality of agent clusters.

2. The processor-based method of claim 1, wherein the predictive machine learning model is further configured to determine, for each lead record of the plurality of lead records stored in the lead model database, an assigned individual agent from the assigned agent cluster assigned for sales contacts with the lead represented by the lead record.

3. The processor-based method of claim 1, wherein the agent model data is generated by extracting data representative of the agents from one or more agent databases, and flattening the extracted data, wherein so that the flattened extracted data representative of a respective one of the agents comprises a single record of the agent model data.

4. The processor-based method of claim 3, wherein the unsupervised clustering determines a clustering vector for each the respective one of the agents via weighted agent attributes selected from features of the single record of the agent model data, wherein the unsupervised clustering analyzes degree of similarity of the clustering vector.

5. The processor-based method of claim 1, wherein a type of the unsupervised clustering is selected from one of more of Gaussian Mixture Model, k-means, spectral clustering, principal component analysis (PCA), and density-based spatial clustering of applications with noise (DBSCAN).

6. The processor-based method of claim 1, wherein the unsupervised clustering includes a positive target based on the agent model data representative of each agent and a negative target based on agent model data representative of other agents selected based on similarity of book of business data.

7. The processor-based method of claim 1, wherein the supervised clustering assigns each of the leads to one of the agents via one of greedy model that determines the one of the agents that has a highest conversion score, or Bayesian Bandits heuristics that assigns each of the leads to the one of the agents in order to maximize cumulative expected conversion scores.

8. The processor-based method of claim 1, wherein the aggregate conversion model applies a Thompson sampling algorithm.

9. The processor-based method of claim 1, wherein the supervised clustering comprises a Generalized Linear Mixed Model (GLMM).

10. A processor-based method comprising:
executing, by a processor, a predictive machine learning model configured to determine an assigned agent cluster and an individual assigned agent from the assigned agent cluster for each lead record of a plurality of lead records stored in a lead model database, by applying a combination of an unsupervised clustering analysis, a supervised clustering, and an aggregate conversion model, to lead data representative of leads and agent model data representative of agents, the predictive machine learning model outputting a plurality of agent clusters and sales conversion scores, wherein each of the sales conversion scores is representative of a likelihood that a respective lead will accept an offer to purchase a product from a respective agent from the assigned agent cluster within the plurality of agent clusters;
wherein execution of the aggregate conversion model using the agent model data as input generates a score for each of the agents and for each lead as output, the scores provided as input to the supervised clustering to generate the plurality of agent clusters for the agents,
wherein the unsupervised clustering analysis determines a clustering vector for each of the agents from the agent model data and clusters each of the agents into one of the plurality of agent clusters based on degree of similarity of the clustering vector, and wherein assignment of each of the leads to one of the agents comprises execution of one of a greedy model that determines the one of the agents that has a highest conversion score for that lead, or Bayesian Bandits heuristics that assigns each of the leads to the one of the agents in order to maximize cumulative expected conversion scores; and running, by the processor, the predictive machine learning model on demand to update and display, by a display device in operative communication with the processor, a graphical user interface (GUI) including information representative of the plurality of agent clusters and assignments of respective leads to respective agent clusters within the plurality of agent clusters and to respective individual assigned agents within the respective agent clusters for contacts with the respective leads.

11. The processor-based method of claim 10, wherein the predictive machine learning model is continually trained using updated lead model data and updated agent model data generated by extracting data representative of the agents from one or more agent database, and flattening the extracted data so that the extracted data representative of a respective one of the agents comprises a single record of the agent model data.

12. The processor-based method of claim 10, wherein the unsupervised clustering analysis determines the clustering vector for each of the agents via weighted agent attributes selected from features of a single record of the agent model data.

13. The processor-based method of claim 10, wherein the aggregate conversion model applies a Thompson sampling algorithm.

14. The processor-based method of claim 10, wherein the supervised clustering applies a Generalized Linear Mixed Model (GLMM).

15. The processor-based method of claim 10, wherein the step of running the predictive machine learning model on demand updates and displays information on one or more features that were used to assign the respective leads to the respective agent clusters, makeup of the respective leads assigned to the respective agent clusters, and information on one or more features that were used to assign the respective leads to respective individual assigned agents on the display device running a customer relationship management platform.

16. The processor-based method of claim 10, wherein each of the contacts with the respective leads comprises one or both of an inbound contact of the respective lead with an agent from the respective group of two or more agents or an outbound contact of the agent from the respective group of two or more agents with the respective lead.

17. A system comprising:

non-transitory machine-readable memory that stores lead model records for a plurality of leads, sales records for a plurality of sales, and agent model records for a plurality of agents, wherein the agent model records comprise a flattened data structure comprising a single record for each of the plurality of agents;

a predictive machine learning model configured to determine an assigned agent cluster for each lead model record for the plurality of leads of an enterprise by applying a combination of an unsupervised clustering analysis, a supervised clustering, and an aggregate conversion model; and a processor in operative communication with a display, wherein the processor in communication with the non-transitory, machine-readable memory and the predictive machine learning model executes a set of instructions instructing the processor, for each agent model record, to:

apply the unsupervised clustering analysis to lead model data, the sales data, and agent model data to determine a plurality of agent clusters by determining a clustering vector for each of the agents in the agent model data and including each of the agents in one of the plurality of agent clusters based on degree of similarity of the clustering vector, wherein each assigned agent cluster is representative of a respective group of two or more of the plurality of agents assigned for contacts with a lead represented by each lead model record;

apply the supervised clustering to the aggregate conversion model to assign each of the leads of the enterprise to one of the plurality of agent clusters determined by the clustering analysis;

output the plurality of agent clusters, the agents included in each of the plurality of agent clusters, and the assignments of each of the leads of the enterprise to one of the plurality of agent clusters wherein execution of the aggregate conversion model using the agent model data as input generates a score for each of the agents and for each lead as output, the scores provided as input to the supervised clustering to generate the plurality of agent clusters for the agents; and run the predictive machine learning model on demand to update and display, by a display device in operative communication with the processor, a graphical user interface including information representative of the plurality of agent clusters, the agents included in each of the plurality of agent clusters, and the assignments of each of the leads of the enterprise to one of the plurality of agent clusters for the contacts with the respective lead.

18. The system of claim 17, wherein the processor is a server running a customer relationship management platform in operative communication with a user display device, wherein the server runs the predictive machine learning model on demand to update and display information on the user display device comprising one or more features that were used to assign the agents included in each of the plurality of agent clusters, and makeup of each of the leads of the enterprise assigned to one of the plurality of agent clusters on the user display device.

19. The system of claim 17, wherein the processor is a server, wherein the set of instructions further instruct the server to run the predictive machine learning model on demand to update and display information about assignment of a given lead of the enterprise to one of the plurality of agent clusters, and information about an individual assigned agent assigned to the given lead, in an ongoing communication session with the display device.

* * * * *